US011481252B2

(12) United States Patent
Kampman

(10) Patent No.: US 11,481,252 B2
(45) Date of Patent: Oct. 25, 2022

(54) PROCESS DEFERRAL SYSTEM AND METHODS USING TOKENS

(71) Applicant: Kyocera Document Solutions Inc., Osaka (JP)

(72) Inventor: Eric Louis Kampman, Albany, CA (US)

(73) Assignee: Kyocera Document Solutions Inc., Osaka (JP)

( * ) Notice: Subject to any disclaimer, the term of this patent is extended or adjusted under 35 U.S.C. 154(b) by 381 days.

(21) Appl. No.: 16/752,926

(22) Filed: Jan. 27, 2020

(65) Prior Publication Data
US 2021/0232423 A1 Jul. 29, 2021

(51) Int. Cl.
*G06F 9/48* (2006.01)
*G06F 1/3234* (2019.01)
*G06F 3/12* (2006.01)

(52) U.S. Cl.
CPC .......... *G06F 9/4881* (2013.01); *G06F 1/3234* (2013.01); *G06F 3/1296* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 5,960,168 A | 9/1999 | Shaw et al. | |
| 8,923,346 B2 * | 12/2014 | Li | G04G 7/00 709/248 |
| 2008/0080003 A1 | 4/2008 | Ferlitsch et al. | |
| 2014/0237476 A1 | 8/2014 | Steffen et al. | |
| 2020/0012813 A1 * | 1/2020 | Barday | G06F 21/6245 |

* cited by examiner

*Primary Examiner* — Charlie Sun
(74) *Attorney, Agent, or Firm* — Millen, White, Zelano & Branigan, P.C.; William F. Nixon

(57) ABSTRACT

A processing system includes a service provider, such as a printing device, that receives requests to process tasks or jobs from service requesters. At times, the service provider will not be available for processing and will generate deferral responses to the service requesters. The deferral responses include a condition to be met before processing requests can be resent from the service requesters. After the condition is met, the processing requests are resent to the service provider to be fulfilled.

19 Claims, 14 Drawing Sheets

PROCESS DEFERRAL SYSTEM AND METHODS USING TOKENS

FIELD OF THE INVENTION

The present invention relates to a system to defer the processing of tasks between a service provider and at least one server requester using tokens.

DESCRIPTION OF THE RELATED ART

Systems may include a number of service requesters, such as computing or mobile devices, that send tasks to one or more service providers. The service provider processes the data to complete the task and then takes action. In some instances, the service provider enters into a "sleep" or power down mode to save energy. Repeated requests to complete tasks, however, interrupt these states, sometimes for a small or non-urgent task. In other instances, the service provider finds its resources overwhelmed with tasks, which causes delay and uncertainty as to when the task will be completed.

SUMMARY OF THE INVENTION

A method for managing job requests in a system is disclosed. The method includes receiving opt-in tokens at a service provider from a plurality of service requesters. Each service requester provides an opt-in token. The method also includes placing the service provider into an intermediate state when the opt-in token for each service requester is confirmed. The method also includes sending a deferral response having a condition and an indicator for each processing request for the plurality of service requesters. The indicator is unique to each deferral response. The method also includes deferring each processing request at the respective service requester until the condition is met. The method also includes removing the service provider from the intermediate state. The method also includes receiving each processing request again with the indicator at the service provider after the condition is met. The method also includes processing each processing request according to the indicator.

A system of managing processing jobs is disclosed. The system includes a plurality of service providers to process the processing jobs. Each of the plurality of service providers has an operational state and an intermediate state such that the operational state performs the processing jobs and the intermediate state defers the processing jobs until a condition is met. Each of the plurality of service providers generates a deferral response to send during the intermediate state. The system also includes a plurality of service requesters connected in the system to the plurality of service providers. The plurality of service requesters generates the processing jobs and sends processing requests to the plurality of service providers to perform the processing jobs. The plurality of service requesters is configured to maintain the processing jobs for a first service provider of the plurality of service providers upon receipt of a first deferral response having a first condition from the first service provider. The plurality of service requesters also is configured to resend the processing jobs to the first service provider when the first condition is met. The system also includes at least one router to connect the plurality of service providers and the plurality of service requesters. At least one router closes any network connections between the first service provider and the plurality of service requesters during the intermediate state.

A method for deferring processing requests at a service provider is disclosed. The method includes receiving opt-in tokens at a service provider from a first service requester and a second service requester. The method also includes placing the service provider into an intermediate state. The intermediate state uses less power than an operational state for the service provider. The method also includes receiving a first processing request from the first service requester at the service provider. The method also includes receiving a second processing request from the second service requester at the service provider. The method also includes sending a first deferral response having a condition and a first indicator to the first service requester from the service provider. The method also includes sending a second deferral response having the condition and a second indicator to the second service requester from the service provider. The method also includes, when the condition is met, resending the first processing request and the second processing request to the service provider. The method also includes processing respective processing jobs for the first processing request according to the first indicator and the second processing request according to the second indicator. The first indicator differs from the second indicator.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
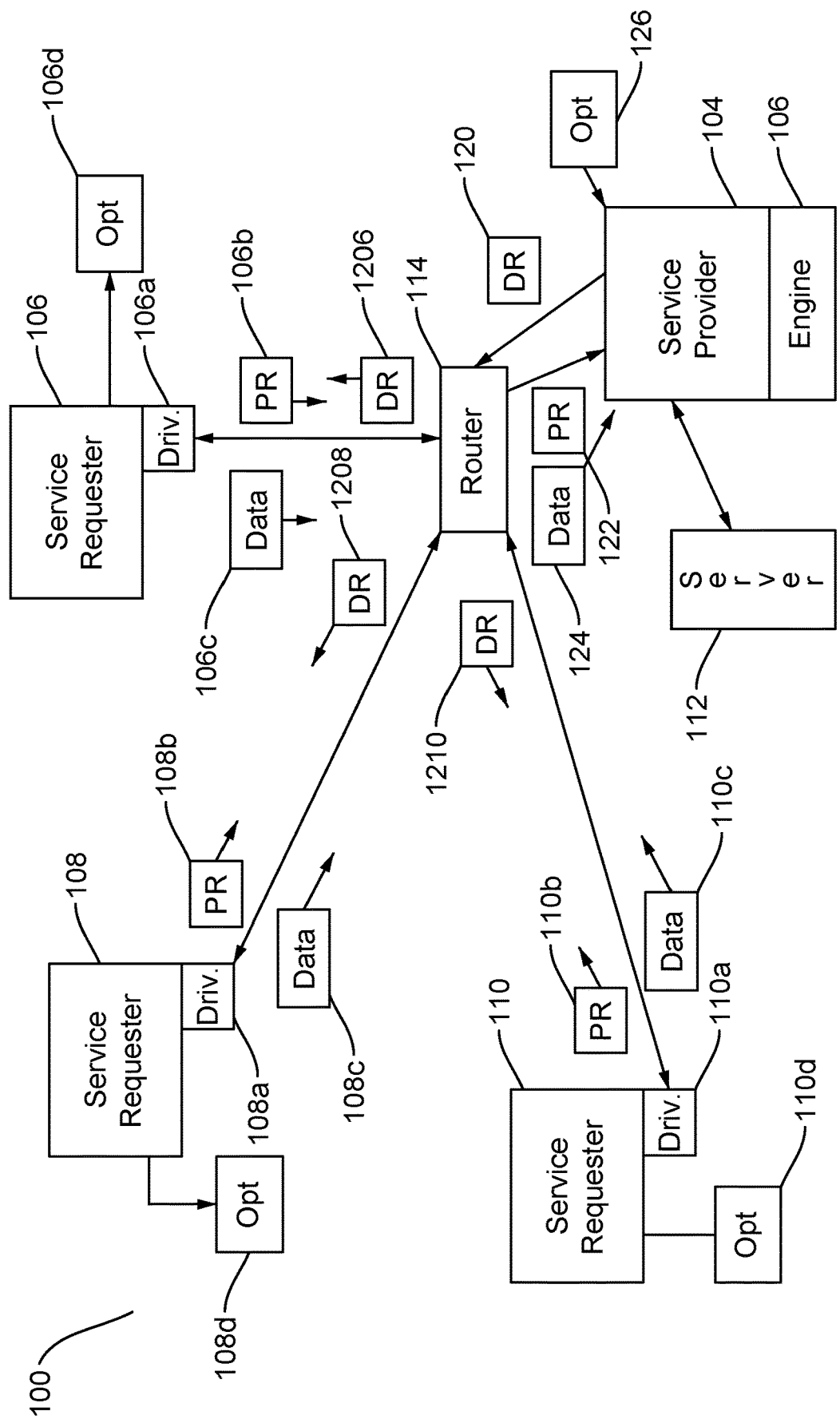
FIG. 1A illustrates a processing system to defer processing requests between a service provider and service requesters according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

At times, a device may be asleep or in a powered-down mode to save resources and energy. The device may "wake up" when a processing request is received, such as a print job to print a document. The disclosed embodiments seek to consolidate processing requests to execute at the same time so that the device is not being turned on and powered down repeatedly. For example, a printing device may consolidate print jobs to process at some point, preferably when a condition is met. Examples of a condition include a certain number of received print jobs, a specified time of the day, a total amount of data received from the requesting devices, and the like.

In some embodiments, the service provider, such as a printing device, enters into a certain state. This state may be known as an intermediate state. In the intermediate state, the service provider is capable of receiving packets of data and respond accordingly. Before entering the intermediate state, the service provider prepares a response to send to any devices requesting services. In some instances, the response may be a "canned" response in that it is automatically generated when the service provider enters the intermediate state. The response also may include a number used once, or nonce, or an absolute time or date to resubmit the processing requests.

Preferred Definitions

Service provider—a network entity or device capable of providing some service, such as a printer, copier, scanner, and the like. A service provider also may be known as a server client.

Service requester—a network entity or device that makes requests of the service provider, such as a word processing application on a computer, mobile device, and the like, a printer driver, an application, and the like. A service requester also may be known as a client.

Service deferral response—a response from the service provider indicating that the service requested is to be deferred.

Nonce—number used once. A value used by the service provider, containing state information or for prioritization of deferred service requests. In addition, an indicator may refer to a nonce.

SP—a space character.

CRLF—carriage-return line-feed (HTTP message header delimiter).

HTTP-date—a date formatted as per section 14.18 of the HTTP 1.1 RFC.

In some embodiments, the following sequence of events may be followed, as disclosed in greater by the figures disclosed below. A request for a service is made by the client. The request may include an indication that deferral is acceptable, or an opt-in feature. Some processing requests may not be deferred due to an urgent request or other overriding factor. Thus, these requests may not be deferred. The service request may provide an opt-in token indicating that deferral is acceptable.

The service provider may process the request normally. Alternatively, a response may be sent containing the following information: that the service request is deferred, a time after which it may be acceptable to make the request again, the current time as calculated by the service provider, if available, and, optionally, a nonce that the service provider may use subsequently in determining prioritization. When the elapsed time has passed, or a specified condition is met, the request may be made again. In some embodiments, the request may be delayed by the service requester for a limited, random amount of time so that the service provider is not inundated with many requests within a short period, or all at once. The request may be processed or the service provider may return another service request deferral, as disclosed above.

The service provider may need to interoperate with devices that are capable of participating in the service itself, but not capable of participating in deferred service. In this instance, and if possible, a token or other means is implemented so that the service provider is notified that the requester is capable. The token may be an opt-in token.

The service provider may be on the upstream side of a network address translation (NAT) router. If so, then the service provider may not be able to initiate connections to the service requester. Further, the service provider may be unable to cache the entirety of the processing request in its current state. The current state also may be known as the intermediate state. When in energy-saving mode, the hard disk of the service provider may be spun down. Thus, the responsibility for caching and retrying is placed with the service requester.

The action of keeping the network connection, likely transmission control protocol (TCP), open until the service provider is capable of fulfilling the request may place an undue burden on the service provider and the service requester. Additionally, intervening routers may preclude the maintenance of long-open connections without some sort of "keep-alive" mechanism. Thus, the network connection may be closed after the deferral response is sent from the service provider. This feature may free network resources.

The service provider may be constrained in how it can respond with a service deferral response. For example, the service provider may be incapable of sending anything but a fixed response. At some point, the fixed response is created. The fixed response is sent to each requester that sends a processing request while the service provider is in the intermediate state. The response, therefore, may not contain the current date or time nor a nonce. The service provider may be capable of formatting a current date or time and appending this to the response but not capable of security algorithms, such as SHA2. Thus, it may not be able to generate a nonce.

Because the disclosed embodiments supports the notion of the delivery of a fixed response, the service deferral response may contain a specific time at which the requester may resend the request, as opposed to "N seconds from now." The service provider's clock may be incorrect. Although returning the servicer provider's time in Greenwich Mean Time (GMT) mandates that the service deferral response not be fixed, if possible, the current time should be provided so that the requester may do the calculation required to determine when the request can be resubmitted.

An indicator may be included in the deferral response. The indicator may be a number unique to the deferral response being sent. The indicator may include a nonce, or number used once. If a nonce is provided in the service deferral request, the expectation is that the requester will return the nonce unmodified in it subsequent request resubmission. If it is utilized, then it may provide a number of useful services according to the disclosed embodiments. The nonce may contain state information so that the service provider does not need to maintain this information itself. Examples of state information may be when the request was initially made, how many times the request has been deferred, when the most recent request from this requester occurred, and the like. The nonce also may contain prioritization information. Because it may be out of control of the service provider as to when deferred service requests are resubmitted, there may be limits to the usefulness of such information. One possible approach would be to reissue short-term service deferral responses to low priority requests. A high priority service request may arrive that needs to be processed immediately. The lower priority request is shifted accordingly.

The nonce also may include requester verification information. A nonce may be used to ensure that a request resubmission is valid. If part of the nonce is generated but unknown to requesters, then such a feature may be important. If prioritization is supported, then this feature may be desirable.

FIG. 1A depicts a processing system 100 to defer processing requests between a service provider 104 and service requesters 106-110 according to the disclosed embodiments. Processing system 100 exchanges processing requests between devices. A network may connect the devices. Router 112 may control information exchanged with service provider 104. In some embodiments, router 112 is a NAT router. Service provider 104 may be upstream of router 104 so that it does not initiate connections to the service requesters. Service requesters 106, 108, and 110 may be devices connected to system 100 via the network to send information to other devices, such as service provider 104, or each other. Such devices include computers, laptops, mobile devices, smart phones and tablets, printing devices, servers, and the like.

Figure 2:
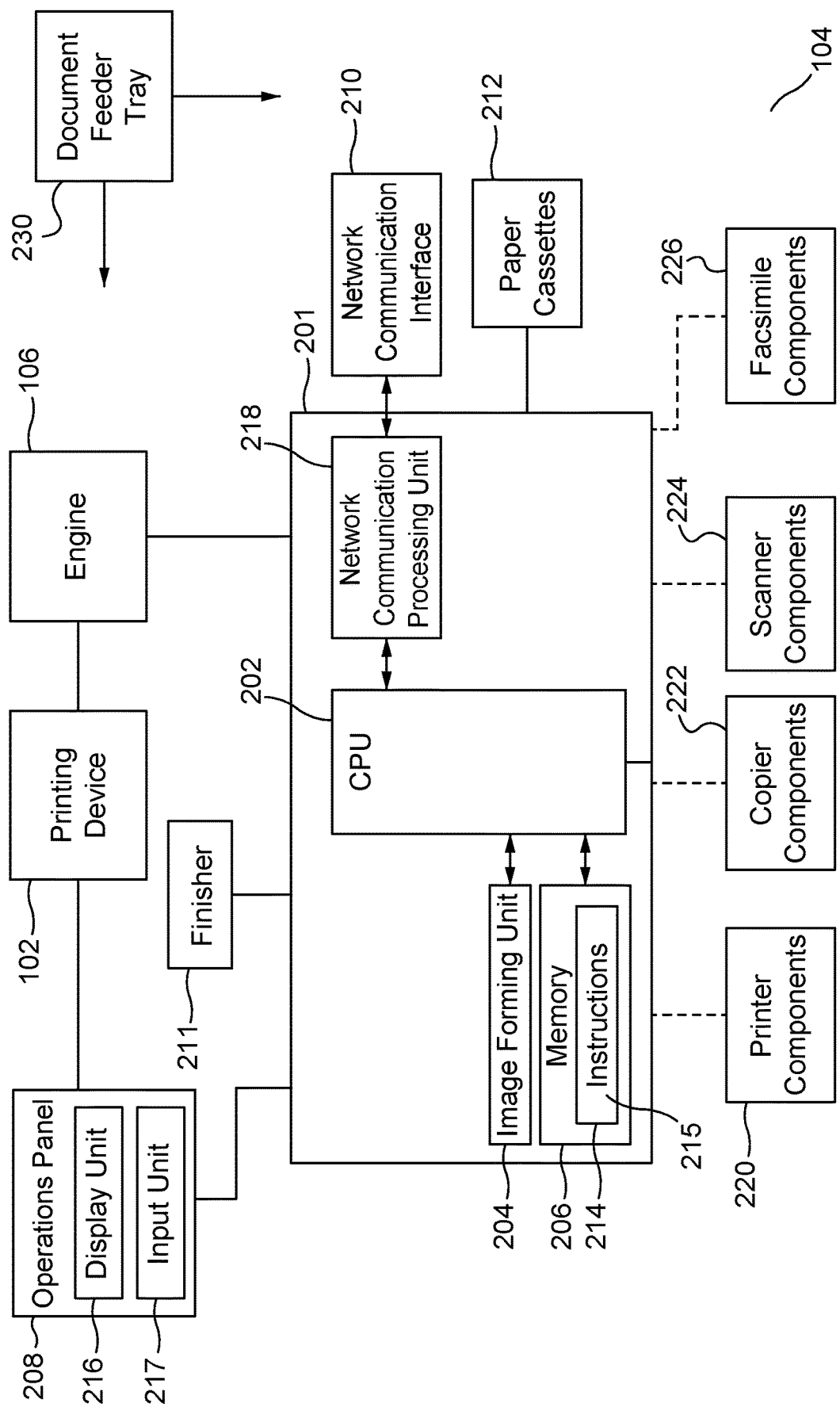
FIG. 2 illustrates a block diagram of components of the printing device used in conjunction with the authentication system according to the disclosed embodiments.

Service provider 104 may be a printing device. FIG. 2 discloses an embodiment of service provider 104 as a printing device. Service provider 104 may receive processing requests 122 that include data 124. Service provider 104 may execute tasks set forth by the processing requests, such as print jobs. Engine 106 in service provider 104 helps complete these tasks. Using data 124, engine 106 processes the requested service on service provider 104. For example, if processing request 122 is a print job, then data 124 corresponds to the data for the document(s) of the print job. Engine 106 uses data 124 to print the document(s) on service provider 104.

Service requester 106 is a device within processing system 100. It is connected to service provider 104. In some embodiments, router 114 receives data from service requester 106 and forwards the data to service provider 104. Service requester 106 includes driver 106a. Driver 106a compiles the data needed to generate processing request 106b. In some embodiments, driver 106a is a printer driver. Driver 106a may be a device driver or hardware driver that is a group of files that enable one or more devices to communicate with the operating system of service requester 106. Driver 106a allows service requester 106 to send and receive data within processing system 100.

Driver 106a may generate processing request 106b. Processing request 106b may include data 106c for a job on service provider 104. Service requester 106 also may generate an opt-in token 106d. Opt-in token 106d is presented to service provider 104 to indicate that service requester 106 will defer processing requests sent to the service provider, if applicable. In some embodiments, service provider 104 may have an opt-in token from a device in order to issue a deferral response. The opt-in token may be a string of data including information that identifies the applicable device.

Service requesters 108 and 110 may include the features of service requester 106 disclosed above. Thus, service requester 108 includes driver 108a and generates processing request 108b with data 108c. It also may generate opt-in token 108d to present to service provider 104. Service requester 110 includes driver 110a and generates processing request 110b with data 110c. Opt-in token 110d indicates to service provider 104 that service requester 110 will defer processing requests, if applicable.

Router 114 may receive the data from service requesters 106, 108, and 110. For brevity, router 114 is shown sending processing requests 122 having data 124 to service provider 104. Processing requests 122 may include processing requests 106b, 108b, and 110b. Data 124 may refer to data 106c, 108c, and 110c with their respective processing requests. Opt-in tokens 126 may refer to one or more opt-in tokens received from the devices in processing system 100.

Service provider 104, under some instances, may generate deferral responses 120 when receiving processing requests. Deferral responses are disclosed in greater detail below but include instructions and information to the service requesters to defer processing until a later specified point in time. Preferably, a condition is met at service provider 104 that allows processing requests to be received. In some instances, a deferral response is generated for every processing request and processing must be deferred for service provider 104. Alternatively, a deferral response is generated for low priority requests and not every request is deferred.

Referring to FIG. 1A, different deferral responses are sent to the different service requesters in processing system 100. For example, service requester 106 may receive deferral response 1206 when processing request 106b is received at service provider 104. Service requester 108 may receive deferral response 1208 in response to processing request 108b. Service requester 110 may receive deferral response 1210 in response to processing request 110b. The deferral response may be sent to router 114, shown as deferral response 120, which forwards the responses to the appropriate service requester.

Deferral responses 120 may include information to the service requesters that processing at service provider 104 is deferred until a later point in time. An example deferral response 120 is disclosed in FIG. 3. A deferral response, however, includes information that the processing request is deferred. It also may include a time after which it is acceptable to resubmit the processing request. The response also may include the current time as determined by service provider 104. A nonce (number used once) also may be included so that service provider 104 can determine prioritization of the resubmitted processing request after the time specified in the deferral response.

In some embodiments, a condition is met before service provider 104 receives the resent processing requests from service requesters. The condition may be a time value in that at a specified time, service provider 104 wakes up and leaves its powered down, or intermediate, state. It then may begin operations. Another condition may be a period of time after receipt of the processing request, such as two hours from the time provided in the deferral response. Other conditions may include when so many processing requests are received at service provider 104 that it makes sense to power up to begin operations.

After the condition has been met, service requesters 106, 108, and 110 resend processing requests 106b, 108b, and 110b, respectively. The corresponding data for the processing requests are stored at the respective service requester until service provider 104 is ready to begin operations. Preferably, processing requests and data are not stored at service provider 104. This feature prevents the resources of the service provider from being overloaded or the memory not having enough space to allocate to the processing requests. After processing requests are resent, service provider 104 may process them or may return another deferral response. For example, processing request 106b is resent based on the condition set forth in deferral response 1206. Processing requests 108b and 110b also are resent. The processing requirements for processing request 106b may cause further delay to processing requests 108b and 110b. Additional deferral responses 1208 and 1210 are sent from service provider 104 to defer processing of the resent requests until the processing of request 106b is complete.

Processing system 100 also includes server 112. Server 112 may store data for service provider 104. Data for the different jobs may be stored at server 112. Further, server 112 may store the information for service requesters in processing system 100.

In some embodiments, service provider 104 may need to interoperate with devices that are capable of sending processing requests but not capable of participating in the deferred service. Opt-in tokens 126 indicate which device may receive a deferral response and have their requests deferred. The appropriate service requester may provide the opt-in token when it connects to service provider 104. Service provider 104 stores the token to indicate if a service may be deferred. If a service requester does not provide an opt-in token, then its requests may not be deferred. In some embodiments, service provider 104 may require opt-in tokens from every device connected to it before entering the intermediate state to defer processing. In other embodiments, an opt-in token may be sent with the processing request so that service provider 104 knows it can defer processing of that task.

Connections may be established between service provider 104 and the service requesters in processing system 100. To save resources, these connections may be closed when services are deferred. Keeping the network connections open until service provider 104 is capable of processing the requests may place undue burden on the service provider and the service requesters. Further, router 114 may preclude the maintenance of long-open connections without some sort of keep-alive mechanism. Router 114 may close the connection once a deferral response is sent to a service requester. Alternatively, the service requester may close the network connection upon receipt of the deferral request.

Processing system 100 is shown with router 114 connected to service provider 104. In some embodiments, service requesters 106, 108, and 110 may have a network connection with service provider 104. In other words, no routers are between service provider 104 and the service requesters. In other embodiments, multiple routers may be positioned between the service provider and the service requesters. Further, additional service requesters may be included in processing system 100. Additional service providers also may be included.

Figure 1B:
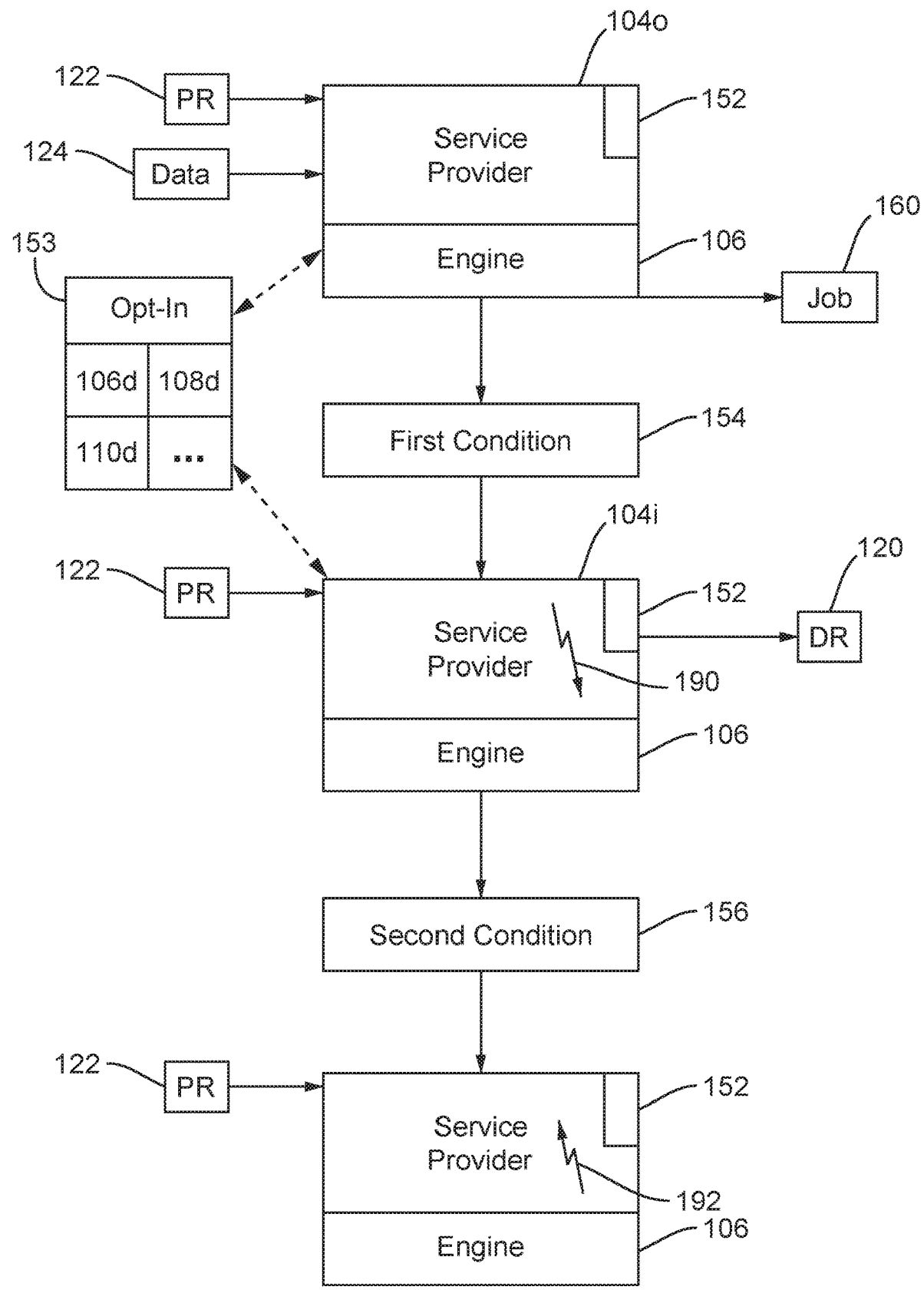
FIG. 1B illustrates a block diagram of a service provider in different states according to the disclosed embodiments.

FIG. 1B depicts a block diagram of a service provider in different states to process or defer processing requests according to the disclosed embodiments. With reference to FIG. 1B, processing request 122 and data 114 along with opt-in token 126 will be used to denote the information received from a service requester, such as service requester 106. Deferral response 120 will be used to indicate the deferral response sent to the service requester.

How service provider 104 treats incoming service request 122 depends on the state of the service provider. The operational state may represent when service provider 104 is processing requests and using the data provided to complete tasks. In other words, the operational state may refer to the "powered up" or on state of service provider 104. It is using all its resources and power to perform the tasks. The intermediate state may represent when service provider 104 is not actively processing requests. Instead, it is deferring them until a later point in time. Service provider 104 is not "off" but more of a "powered down" state. Service provider 104 is not using as much power. Service provider 104 avoids entering back into the operational state in order to conserve power and resources.

Service provider 104 may be shown in two "states" in FIG. 1B. Operational state 104o represents service provider 104 within this state. As shown, processing requests 122 and data 124 may be received at service provider 104. The processing requests are processed so that jobs 160 are generated. For example, if processing request 122 includes a request to print a document embodied by data 124, then job 160 is a print job produced using engine 106 of service provider 104, which is a printing device.

Service provider 104 may stay in operational state 104o until a first condition 154 is met. First condition 154 is a condition or action that causes service provider 104 to power down or reduce processing resources. For example, first condition 154 may be an instruction received at service provider 104 to power down. Alternatively, first condition 154 may be a set period of time during the day that service provider 104 is powered down, such as in the evening or during non-business hours. Other examples include set times to be powered up or down, such as an hour powered up and an hour powered down. Another example may be after a period of inactivity, service provider 104 powers down from the operational state. Still another example may be that memory on service provider 104 is full and further processing requests 122 need to be deferred.

Service provider 104 also may include token table 153 that stores received tokens from service requesters in processing system 100. Token table 153 includes opt-in tokens from all or some of the service requesters. As shown in FIG. 1B, opt-in token 106d from service requester 106, opt-in token 108d from service requester 108d, and opt-in token 110d from service requester 110 are stored in token table 153. Other opt-in tokens 153a also may be stored in the table. In order for service provider 104 to enter the intermediate state and defer processing requests, an opt-in token should be received from the corresponding service requester. Opt-in tokens indicate that the service requesters "opt-in" to the disclosed deferral processes. The tokens may be received with each service request. Alternatively, the opt-in tokens may be received when a network connection is made between the service requester and service provider 104.

After first condition 154 is detected or determined, service provider 104 enters into intermediate state 104i. The intermediate state allows service provider 104 to operate at a reduced power level compared to the operational state. Thus, a power down process 190 may occur. Alternatively, service provider 104 may not power down but defer processing requests until a later time. A key feature of intermediate state 104i is the deferral of processing request 122 received from service requesters. Deferral component 152 of service provider 104 may respond to processing requests with deferral responses 120. A deferral response is disclosed in greater detail in FIG. 3. In some embodiments, deferral component 152 may be the only active component on service provider 104 still functioning during intermediate state 104i.

During intermediate state 104i, connections to other devices in processing system 100 may be closed from service provider 104. Further, service provider 104 may be constrained in how it can respond to a processing request with deferral request 120. Deferral component 152, for example, may not be capable of sending anything but a fixed or canned response. At some point prior to entering intermediate state 104i, a fixed response is generated that is sent to each service requester. Deferral response 120 may not contain a current date or time nor any other information, such as a nonce. It also may be able to format a current date or time and appending this to deferral response 120 but not capable of security algorithms, such as SHA2 or not capable of generating a nonce.

Because deferral response 120 may be a fixed response set by deferral component 152 or service provider 104, it may include a specific time at which the service requester may resend service request 122, as opposed to some fixed time from receipt of the request. Service provider 104 may include a clock to determine a current time or date to append to deferral response 120.

Opt-in tokens may have a bearing on staying in intermediate state 104i. If a processing request is received from a service requester that does not have an opt-in token in token table 153, then service provider 104 may have to leave intermediate state 104i to process the request. In some embodiments, every service requester in processing system 100 must provide an opt-in token to service provider 104 to defer processing requests. Thus, token table 153 is checked to see if opt-in tokens have been received from every requester. If not, then service provider 104 stays in operational state 104o. This feature allows service provider 104 to reduce power and processing operations in a predictable manner A processing request will not be received from a service requester that causes service provider 104 to leave intermediate state 104i before it is supposed to do so.

At some point in time after entering intermediate state 104i, a second condition 156 may occur that places service provider 104 back into operational state 104o. The second condition 156 may differ from first condition 154 in that a condition has been met to invoke a power up process 192 to return service provider 104 to normal operations. Examples of the second condition include a period of time since intermediate state 104i was entered, a set time provided or determined by deferral component 152 or service provider 104, a number of processing requests 122 received at service provider 104, memory or other resources on service provider 104 becoming available, and the like. Another condition could be the receipt of a processing request 122 from a service requester that has not submitted an opt-in token 126 for the deferral service. Power up process 192 will be launched to process the request. Service provider 104 also may receive processing requests 122 deferred during intermediate state 104i.

For example, service provider 104 may entered intermediate state 104i upon meeting first condition 152, which is a set time during the day that operations are to be suspended. In this example, the time may be 2100 hours, when an office is closed for business. At 2100 hours, service provider 104 performs a power down process 190. Any processing requests 122 received during intermediate state 104i will invoke a deferral response 120 being sent to the applicable service requester. Engine 106 will not be used to perform any operations. Within deferral responses 120, certain information will be included, such as a time of the service provider upon issuance of the deferral response and a time that service provider 104 will be in the operational state. A service requester may use the differences in the time to determine when to resent the processing request as its clock may not be synchronized with the clock of service provider 104.

At some point in time after entering intermediate state 104i, service provider 104 will return to operational state 104o. This point in time may be second condition 156. Using the above example, the time may be 0800 hours the following day. This point in time may correspond to working hours so that someone may handle jobs are they are processed. The service requesters resend processing requests 122 to service provider 104 to generates jobs 160. In some embodiments, additional actions may be implemented so that service provider 104 does not receive all deferred processing requests at 0800 hours. Instead, receipt may be staggered or placed in an order to offset processing tasks.

Figure 1C:
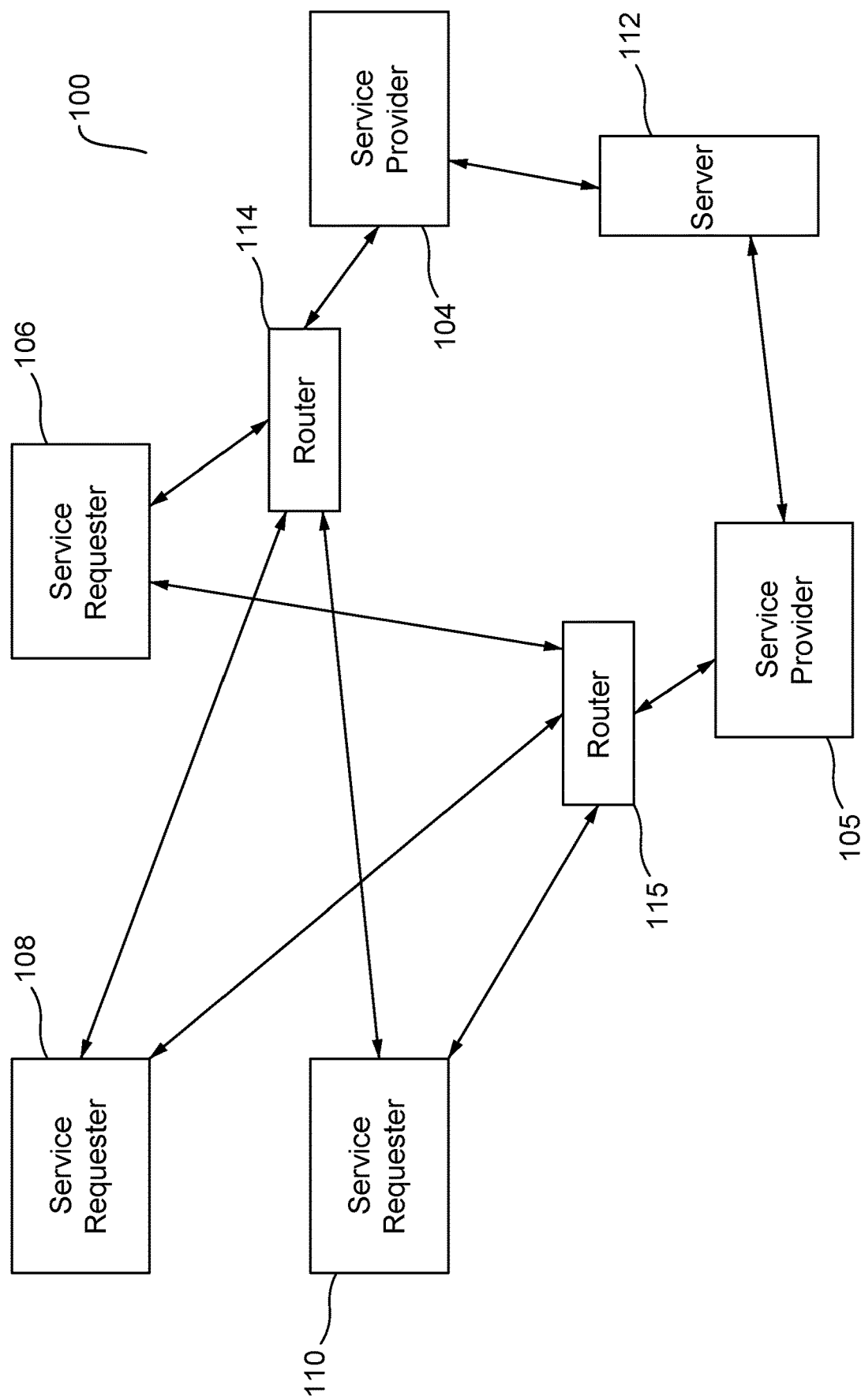
FIG. 1C illustrates the processing system having a plurality of service providers according to the disclosed embodiments.

FIG. 1C depicts processing system 100 having a plurality of service providers 104 and 105 according to the disclosed embodiments. Service requesters 106, 108, and 110 also are shown. Processing system 100 may exchanges processing requests, deferral responses, opt-in tokens, and other information between service requesters 106-110 and service providers 104-105. In some embodiments, all or some of the service providers in processing system 100 may implement the disclosed deferral processes.

Service provider 105 also may be a device that fulfills requests from other devices in processing system 100. Service provider 105 may act like service provider 104 and implements the features disclosed herein. Service provider 105 receives processing requests and performs actions to fulfill the requests. In some embodiments, service provider 105 is a printing device. Router 115 may act like router 114 in that it receives data meant for service provider 105. Service provider 105 also enters and exits the intermediate state to defer processing requests.

In some embodiments, when service provider 104 is in the intermediate state, service provider 105 also may be in an intermediate state such that all service providers defer processing requests. In other embodiments, service providers 104 and 105 alternative operational and intermediates states so that processing system 100 always has a device online that processes requests. At times, however, special processing operations are only available at one service provider or the other such that processing requests may not be diverted to a service provider that is operational.

Service provider 105 also may be connected over processing system 100 to server 112 to store data or access information on the server. Service provider 105 also may have a token table 153 to store opt-in tokens so that it can manage the deferral of processing requests like service provider 104, disclosed above. Deferral of processing requests at service provider 105 may occur until a condition is met. This condition may not necessarily be the same as a condition for service provider 104. As disclosed above, processing system 100 may desire to have at least one service provider operational at all times.

FIG. 2 illustrates a block diagram of components of service provider 104 as a printing device according to the disclosed embodiments. In the disclosure of FIG. 2, service provider 104 may be referred to as printing device 104. The architecture shown in FIG. 2 may apply to any multi-functional printer or image forming apparatus that performs other functions, such as printing, scanning, storing, copying, and the like. As disclosed above, printing device 104 may send and receive data from public domain 110 and private domains 120 and 130. These embodiments also may apply to service provider 105.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

In some embodiments, instructions 215 stored in memory 206 will execute to generate deferral component 152 when printing device 104, acting as a service provider, enters an intermediate state. Instructions 215 may turn processor 202 into a special purpose machine in that the disclosed operations are performed within service provider 104. Processor 202 may use network communication processing unit 218 and network communication interface 210 to send deferral responses 120 while in the intermediate state.

Figure 3:
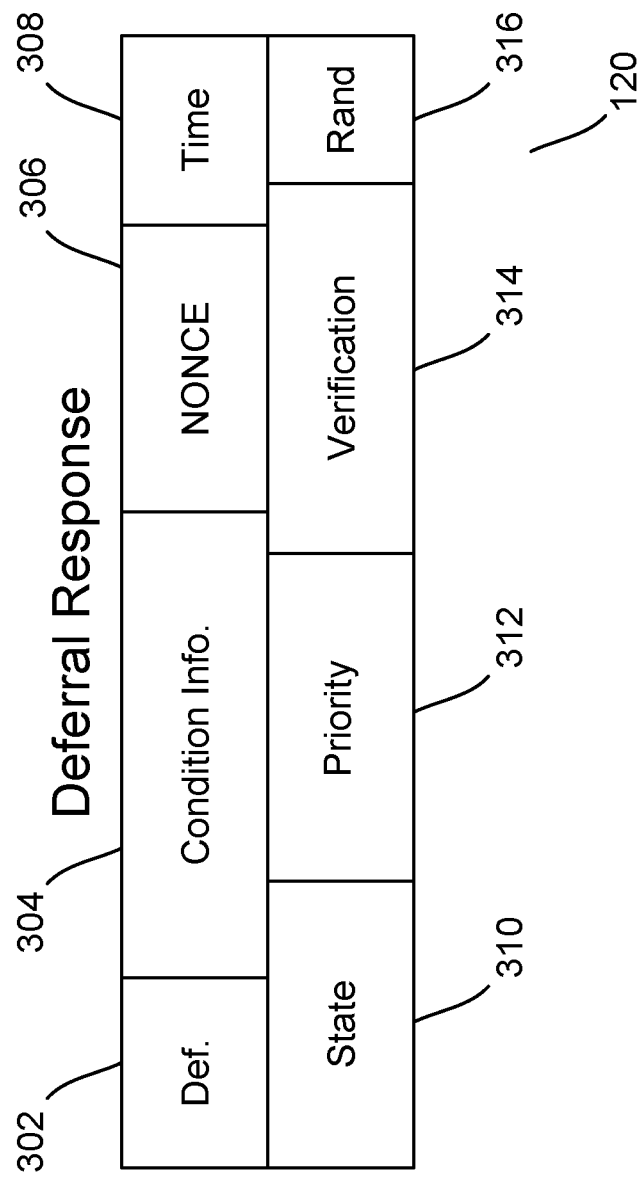
FIG. 3 illustrates a block diagram of a deferral response according to the disclosed embodiments.

FIG. 3 depicts a block diagram of a deferral response 120 according to the disclosed embodiments. In some embodiments, deferral response 120 may be a packet of data sent to the service requesters to instruct or provide information to them on how to operate during the intermediate state of service provider 104. FIG. 3 shows some of the data types that may be included in deferral response 120. Additional data types also may be included. Further, deferral response 120 does not require all the different data types disclosed herein.

Deferral response 120 includes data. The data may be within fields comprising deferral response 120. The features of deferral response 120 disclosed below may be referred to as fields but may be flags, codes, and the like. Deferral response 120, at a minimum, includes defer field 302. This field indicates to a service requester that the received processing request is deferred. Condition information field 304 indicates the condition to be met before the deferred processing request may be resent to service provider 104. The data in condition information field 304 may correspond to second condition 156 in FIG. 1B. In some embodiments, a time in GMT is the condition. After the time, it is acceptable to send the deferred processing request again. Other conditions also may be implemented, as disclosed above. Current time field 308 also may be provided as calculated by service provider 104, in GMT.

Additional fields within deferral response 120 include a nonce field 306. Nonce field 306 also may be known as an indicator. The indicator uniquely identifies deferral response 120 from another deferral response. As disclosed above, nonce may refer to a number used once. Each deferral response 120 may have a unique number assigned to it that is used once. A nonce will not be used twice during an intermediate state. The nonce may be used for various reasons. Nonce field 306 may include a nonce that service provider 104 uses subsequently in determining prioritization when the deferred processing requests 122 are resent. For example, each deferral response 120 may provide a nonce value that determines the order that the subsequent processing request is processed. The first processing request received may receive the highest prioritization using a nonce value of 1, for example. Alternatively, deferral components 152 may assign higher priority tasks a higher priority nonce value.

If nonce field 306 is in deferral response 120, then additional fields may be implemented as well. For example, deferral response 120 may include state information field 310, prioritization information field 312, and verification information field 314. If a nonce is provided in deferral response 120, then the expectation is that the service requestor will return the nonce unmodified in the subsequent resubmitted processing request. The service requester may append the processing request with the nonce in nonce field 306. Along with the nonce, other information in the fields disclosed above may be provided in the resent processing request.

State information field 310 may include state information so that service provider 104 need not maintain this information itself. Examples of state information may include when the processing request was initially made or received at service provider 104. Other state information may include how many times the processing request has been deferred or when the most recent processing request from the service requestor occurred. Other information pertaining to service provider 104 also may be included such as an internet protocol (IP) address and a destination for the resent processing request within processing system 100.

Prioritization information field 312 may include prioritization information. Prioritization information may indicate whether the deferred processing request is a low, medium/standard, or high priority. Other designations may be used. Because it is entirely out of the control of service provider 104 as to when deferred processing requests will be resent, there may be limits to the usefulness of such information. One feature may be to reissue short-term deferral responses 120 to low priority processing requests in anticipation that a high priority processing request will soon arrive at service provider 104 to be processed immediately. One example may be that resent processing requests include the received prioritization information provided in field 312 of deferral response 120. Service provider 104 may process the higher priority indicated requests first, and so on.

Deferral response 120 also may include requester verification information field 314 having verification information. A nonce may be used to ensure that a resent processing request is valid if the means by which part of the nonce in nonce field 306 is generated is unknown to service requesters, such as what salt for a hash function is used. If prioritization is supported by deferral response 120, then this information may be important.

Deferral response 120 also may include random number field 316. This field may include a random number for use by the service requester to delay resending of the deferred processing request. In other words, condition information field 304 may include a time to resend the processing requests. The processing request associated with deferral response 120 may further delayed according to the random number in field 316. This feature may prevent resending deferred processing requests all at once to service provider 104. This feature also may be desirable if a nonce is not used for prioritization.

Figure 4:
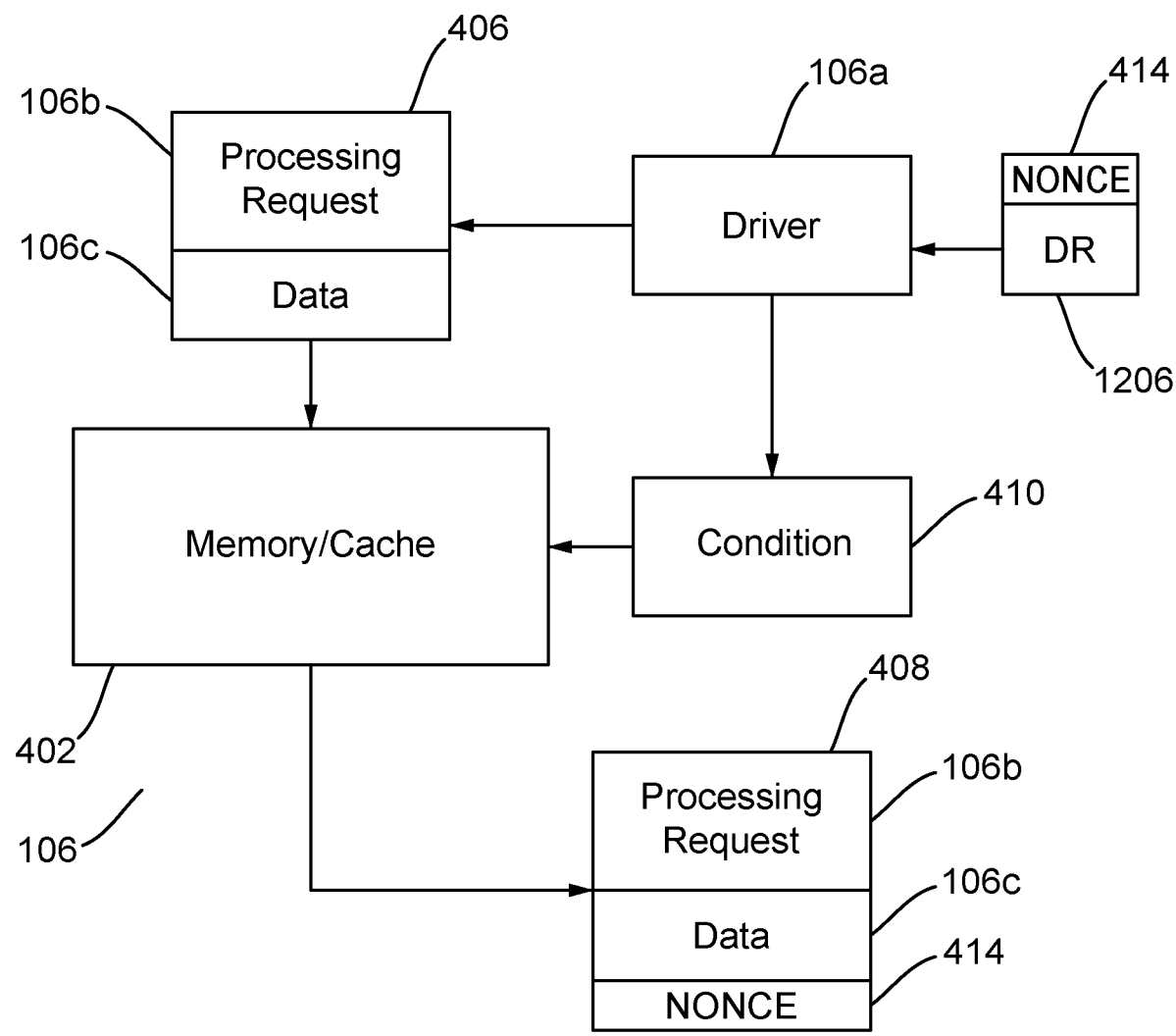
FIG. 4 illustrates the deferred processing in a service requester according to the disclosed embodiments.

FIG. 4 depicts deferred processing of processing request 122 in a service requester according to the disclosed embodiments. For illustrative purposes, FIG. 4 is disclosed with reference to service requester 106. Thus, processing request 106b will be used instead of processing request 122. The disclosed embodiments may apply to other service requesters and any processing requests provided therefrom.

In FIG. 4, deferral response 1206 is received at service requester 106. Driver 106a may receive the deferral response if it sent the original processing request 106b.

Preferably, a copy of processing request 106a along with any applicable data 106c is still stored in or available to driver 106a. Driver 106a may instruct service requester 106 to store deferred processing request 406 in memory or cache 402. Thus, the deferred processing request plus any data is cached in memory 402 located in service requester 106 instead of service provider 104.

This feature ensures that resources at service provider 104 are not tied up with storing deferred processing requests. Service provider 104 also may have the hard disk and associated components powered or spun down during the intermediate state. Further, it is up to service requester 106 to determine when to resend the deferred processing requests. In some embodiments, multiple deferred processing requests 406 may be stored in memory 402.

When condition 410 is met, then service requester 106 will resend the processing request and the data to service provider 104 as resent processing request 408. Resent processing request 408 may include nonce 414 if a nonce was included with deferral response 120. Nonce 414 also may include other information besides the number used once, as disclosed above, to facilitate processing within service provider 104. This information is provided specifically to service requester 106 for the particular resent processing request based on the deferred processing request stored in memory 402. Driver 106a may resend the processing request to service provider 104.

In some embodiments, service provider 104 may implement a random delay before resending the processing request, such as resent processing request 408. When condition 410 is met, such as a specified time has passed, resent processing request 408 may be delayed for a limited, random amount of time so that service provider 104 is not inundated with many deferred requests within a very short period. Deferral response 120 may include information to invoke the use of a random time delay. Driver 106a may implement the delay.

Figure 5:
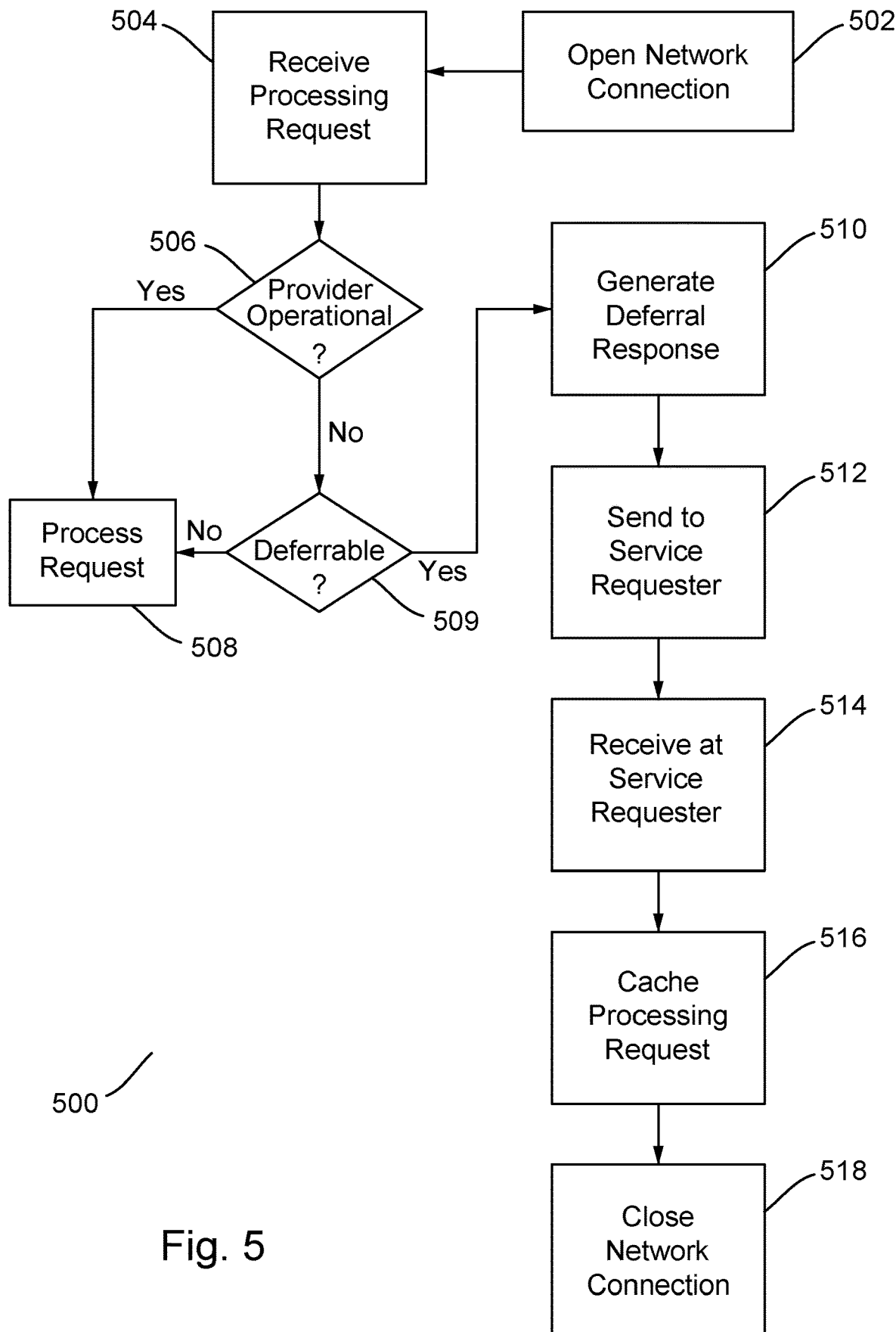
FIG. 5 illustrates a flowchart for deferring a processing request at a service provider according to the disclosed embodiments.

FIG. 5 depicts a flowchart 500 for deferring a processing request 122 at a service provider 104 according to the disclosed embodiments. The disclosure of flowchart 500 may refer to elements disclosed in FIGS. 1A-4 for illustrative purposes. For example, flowchart 500 may refer to processing request 122 and deferral response 120 but the disclosure is applicable to other processing requests and deferral responses disclosed above. A service requester may be any device on processing system 100 and is not limited to the ones disclosed herein. The features of flowchart 500 are not limited by the features disclosed in FIGS. 1A-4.

Step 502 executes by opening a network connection between a service requester and service provider 104 over processing system 100. For the following disclosure, service requester 106 will be referenced as communicating with service provider 104. After opening the network connection, service provider 104 may receive processing requests to perform operations to complete task, such as a print job. Router 114 may help in opening, closing, and maintaining the network connections between the service requesters and service provider 104. Step 504 executes by receiving a processing request 106b at service provider 104. Processing request 106b may include data 106c to complete the job requested by service requester 106.

Step 506 executes by determining whether service provider 104 is in an operational state. In other words, this step determines whether processing request 106b will be received and processed accordingly. If service provider 104 is in the intermediate state, then the processing request will be deferred. If step 506 is yes, then step 508 executes by processing the request along with any data enclosed therein. Referring to FIG. 1B, job 160 may be produced by service provider 104.

Is step 506 is no, then step 509 executes by determining whether processing request 106b is deferrable. In some instances, processing request 106b is not deferrable due to priority or urgency of the request. Service provider 104 will awake and leave the intermediate state to return to the operational state. Alternatively, service requester 106 may not have sent opt-in token 106d so that service requester 106 is not accepting deferrals of processing requests. If step 509 is no, then flowchart 500 proceeds to step 508 to process the received request.

If step 509 is yes, then step 510 executes by generating deferral response 1206 to be sent to service requester 106 in response to processing request 106b. Deferral response 1206 may include the information disclosed in FIG. 3. In some embodiments, this information may include that the processing request is deferred and a time, or condition, at which to resend the processing request to service provider 104. Step 512 executes by sending deferral response 1206 to service requester 106. Service provider 104 may send the deferral response to the IP address for service requester 106 or an address for driver 106a.

Step 514 executes by receiving deferral response 1206 at service requester 106. Service requester 106 analyzes the information within deferral response 1206 in order to take the appropriate action in deferring processing request 106b. As disclosed above, additional information may be included in deferral response 1206, such as a nonce, that will be used in subsequent operations with processing request 106b. Step 516 executes by caching processing request 106b at service provider 106. Referring to FIG. 4, memory 402 may store the data for processing request 106b. Because communications between service requester 106 and service provider 104 are suspended until the deferral period is over, step 518 executes by closing the network connection between these devices within processing system 100.

Figure 6:
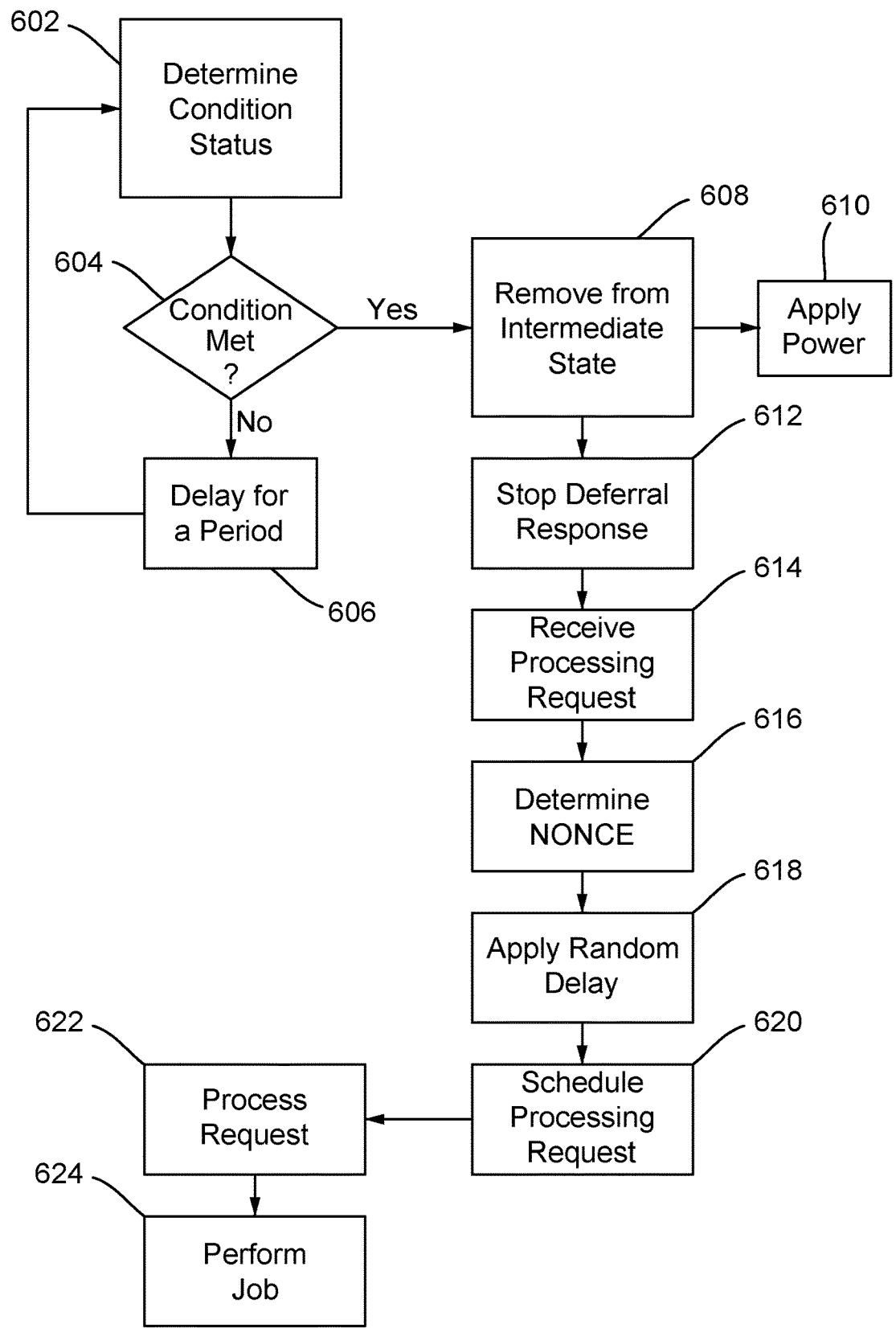
FIG. 6 illustrates a flowchart for receiving deferred processing requests after a condition is met at the service provider according to the disclosed embodiments.

FIG. 6 depicts a flowchart 600 for receiving deferred processing requests 122 after a condition is met at service provider 104 according to the disclosed embodiments. Flowchart 600 may refer to FIGS. 1A-4 for illustrative purposes. The embodiments of FIG. 6 are not limited to the features disclosed by FIGS. 1A-4.

Step 602 executes by determining a condition status. As disclosed in FIG. 1B, second condition 156 occurs to remove service provider 104 from intermediate state 104i back to operational state 104o. For example, the condition may relate to a time in GMT that service provider 104 will receive the deferred processing requests. At this time, the condition is met so that service provider 104 can begin processing jobs received therein. Other conditions may be implemented.

Step 604 executes by determining whether the condition, such as second condition 156, is met according to the condition status. Using the time example, step 604 may compare the clock time at service provider 104 to the point in time for the condition to be met. If no, then step 606 executes by further delaying the processing of requests for a further period of time. Deferral component 152 may continue to generate deferral responses 120 for received processing requests. In other words, intermediate state 104i is extended for another period of time. Flowchart 600 then may proceed back to step 602 check the condition status again.

If step 604 is yes, then step 608 executes by removing service provider 104 from the intermediate state. A power up process 192 may be invoked to return service provider 104 to the operational state where all functions should be available. Step 610 executes by applying the power to service provider 104 to meet the requirements for the operational state. Step 612 executes by stopping the generation of deferral responses 120. No more deferral responses may not be sent until service provider 104 returns to the intermediate state.

Step 614 executes by receiving processing requests 122 from the service requesters that had the requests deferred. Network connections may be reopened between service provider 104 and the service requesters in processing system 100. Referring to service requester 106, one or more processing requests 106b may be sent to service provider 104. Upon receipt, service provider 104 may process the deferred requests as normal along with other possible actions, depending on what was provided in the deferral responses.

Step 616 executes by determining if processing request 106b includes a nonce or other associated information. Deferral response 1206 received at service requester 106 may include a nonce in nonce field 306 as well as other information, such as state information, prioritization information, and verification information. This information may help prioritize or validate the resent processing request. The nonce may be a number assigned to the processing request to place it in a processing order at service provider 104.

Step 618 executes by applying a random delay to processing the resent processing request, if applicable. The random delay also may have been included in deferral response 120 to service requester 106 and then appended to the resent processing request. Alternatively, service provider 104 may generate the random delay to allow other processing request to be addressed first. For example, a low priority processing request may be randomly delayed to allow higher priority requests to be processed first.

Step 620 executes by scheduling the processing request deferred by service provider 104 along with the other received requests 122. The deferred processing requests may be placed in a queue based on their nonce values. For example, a processing request may have a nonce of 0010, which put it ahead of processing requests having a nonce of 0011 or higher. Other forms of scheduling also may be used. This feature prevents service provider 104 may be overwhelmed with processing requests and not processing them in a desired order. As disclosed above, higher priority processing requests may be addressed earlier than low priority ones.

Step 622 executes by processing the deferred processing request. Step 624 executes by performing the job or task associated with the processing request. For example, processing request 106b may include data 106c that has information to complete a print job. Service provider 104 completes the print job using data 106c as requested by processing request 106c.

Figure 7:
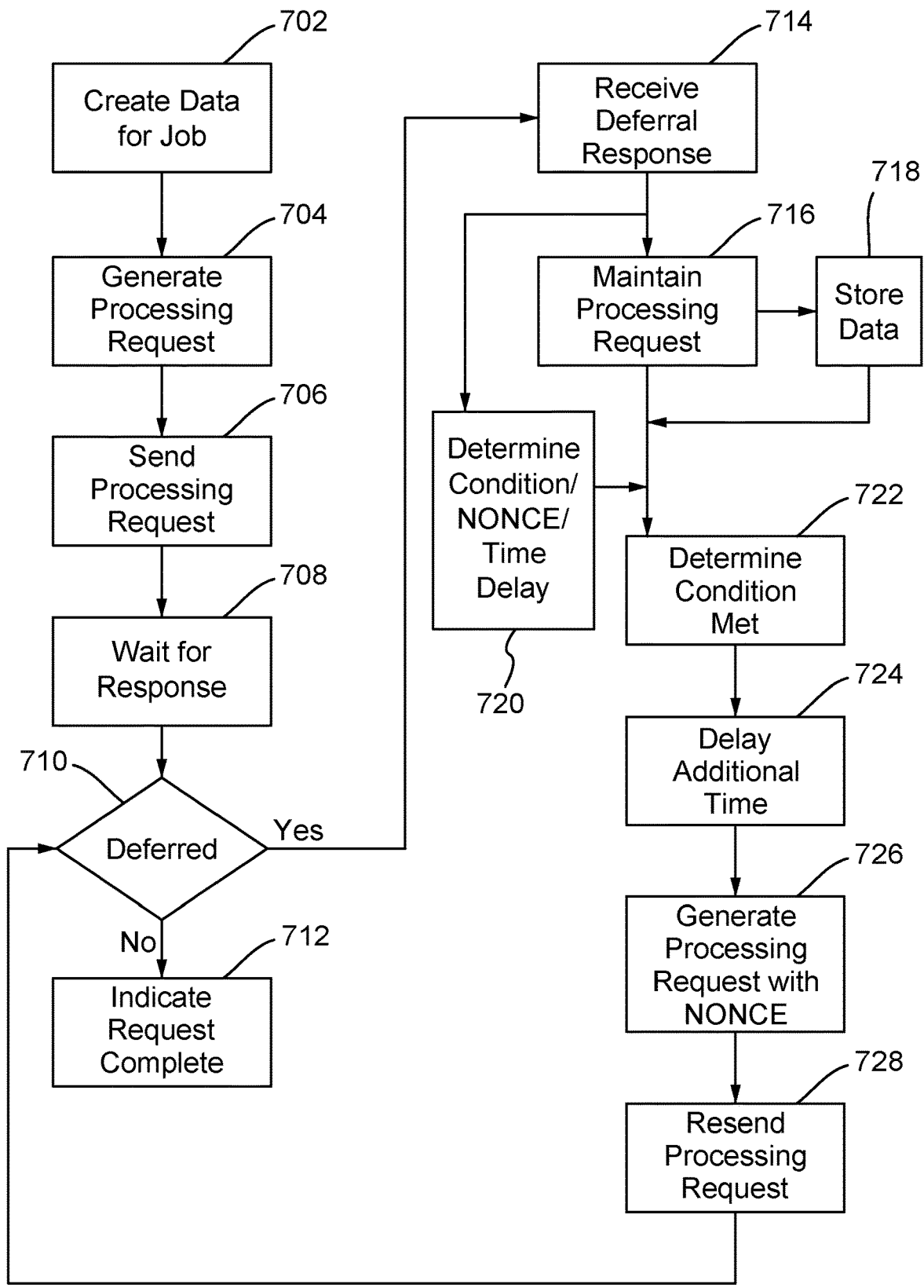
FIG. 7 illustrates a flowchart for generating a processing request and receiving a deferral response at a service requester according to the disclosed embodiments.

FIG. 7 depicts a flowchart 700 for generating a processing request 106b and receiving a deferral response 1206 at a service requester 106 according to the disclosed embodiments. Flowchart 700 may refer to FIGS. 1A-4 for illustrative purposes. The embodiments of FIG. 7 are not limited to the features disclosed by FIGS. 1A-4. For example, any device in processing system 100 may implement the features disclosed by flowchart 700 and these features are not limited to service requester 106. Service requester 106 is used for illustrative purposes.

Step 702 executes by creating data for a job to be processed on service provider 104. Using the printing device example, data may be generated by a word processing application for a print job to print a document based on the data at service provider 104. Service requester 106 will send the print job as processing request 106b to service provider 104.

Step 704 executes by generating processing request 106b. In some embodiments, driver 106a may generate processing request 106b. The processing request may refer to a task or job using data 106c. Processing request 106b may be a request for service. An indication that deferral of processing request 106b is acceptable also may be generated. The indication may be opt-in token 106d. Token 106d may be sent with processing request 106b. Step 706 executes by sending processing request 106b over processing system 100 to service provider 104.

Step 708 executes by waiting for a response from service provider 104. Step 710 executes by determining, at service provider 104, whether processing request 106b is to be deferred. As disclosed above, service provider 104 may be in an intermediate state until a condition is met to return to the operational state. Alternatively, service provider 104 may be deferring processing requests until a condition is met, such as processing operations cease for a higher priority project.

If step 710 is no, then step 712 executes by indicating to service requester 106 that the processing of the request is complete. The task or job is processed and finished according to the instructions received at service provider 104. Service requester 106 may not have to take any further action.

If step 710 is yes, then service provider 104 is not processing requests and deferring them until a later point in time. Thus, step 714 executes by receiving deferral response 1206 at service requester 106. Deferral response 1206 may include the information disclosed by FIG. 3. It tells service requester 106 that the processing request is deferred until a specified condition is met. Step 716 executes by maintaining processing request 106b at service requester 106. Along with the instruction to defer, deferral response 1206 also may include a time in GMT from service provider 104. Service requester 106 may take into account any differences with its clock and the one used to determine the time at service provider 104. Step 718 executes by storing or caching the data for processing request 106b in a memory at service requester 106, such as memory 402 in FIG. 4.

Step 720 may execute after receipt of deferral response 120 to determine the condition to resend processing request 106b, an applicable nonce or other information, and any time delay associated with processing request 106b. Other information may include state information, prioritization information, or verification information. This data may be stored with processing request 106b.

Step 722 executes by determining that the condition to resend processing request 106b has been met. Using the point in time example, the condition of the point in time to resend requests is passed so the condition is met. Service requester 106 determines this feature and does not rely upon alerts or notices from service provider 104. Service requester 106 may set a time using its clock to alert it that the condition is met.

Step 724 executes by delaying operations to resend processing request 106b an additional length of time. The length of time may be randomly generated at service requester 106. As disclosed above, random delays may serve to prevent service provider 104 from being inundated with resent requests. The delay also may be mandated by information provided in deferral response 1206. In some embodiments, step 724 may executed later in flowchart 700.

Step 726 executes by generating or retrieving processing request 106b to resend to service provider 104. Processing request 106b may include the nonce, if provided by deferral response 1206. The nonce will indicate when or how processing request 106b is to be treated upon receipt at service provider 104. As disclosed above, the additional information may be included as well to prioritize, verify, and identify processing request 106b. Step 728 executes by resending processing request 106b at the time specified, if delayed, to service provider 104. The network connection may be re-opened.

Flowchart 700 may proceed back to step 710 to determine if the resent processing request 106b is deferred an additional time by service provider 104. Thus, processing request 106b may be submitted multiple times before it is processed.

Figure 8:
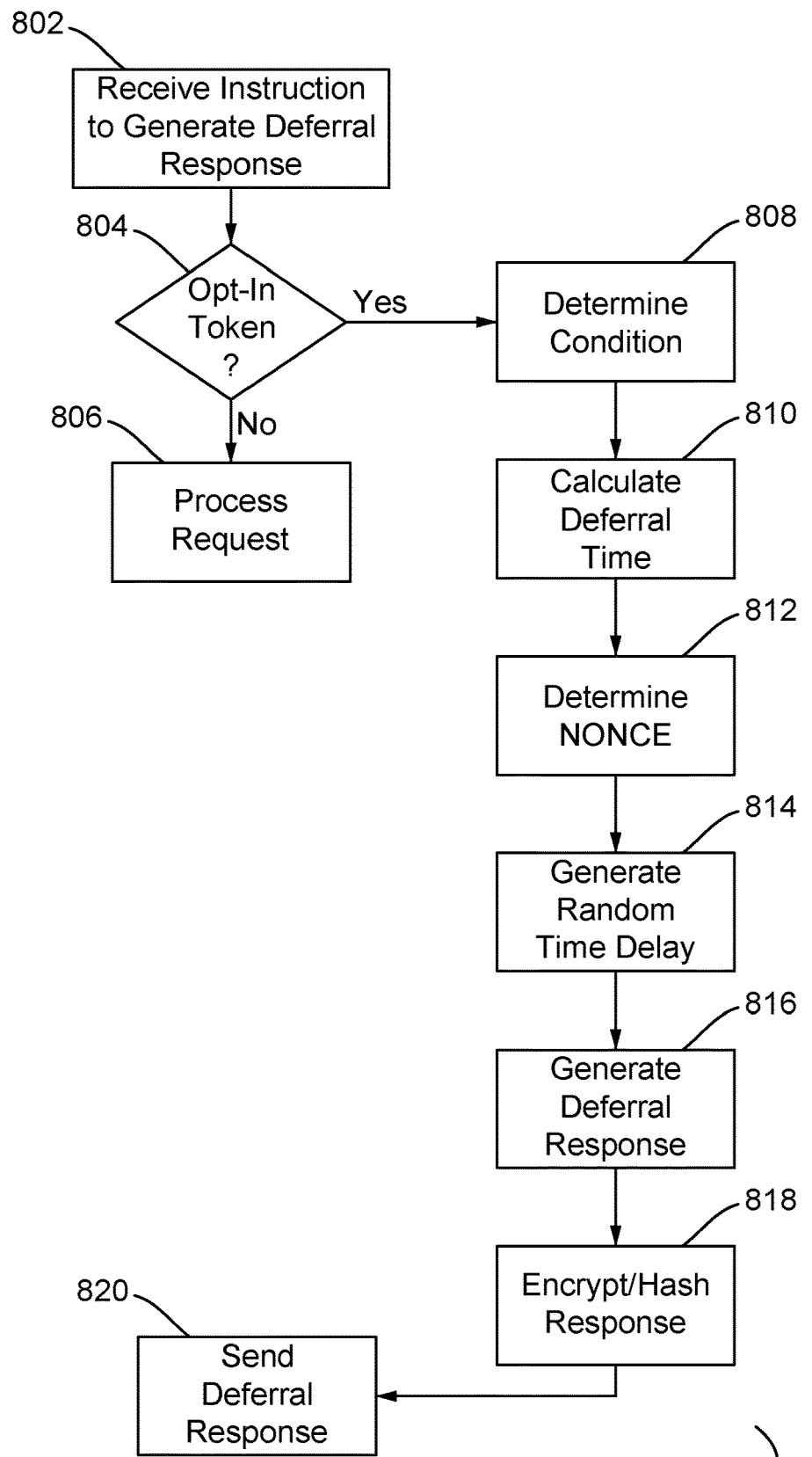
FIG. 8 illustrates a flowchart for generating a deferral response at service provider according to the disclosed embodiments.

FIG. 8 depicts a flowchart 800 for generating a deferral response 120 at service provider 104 according to the disclosed embodiments. Flowchart 800 may refer to FIGS. 1A-4 for illustrative purposes. For example, the disclosure of flowchart 800 may refer to deferral response 120 but may be applicable to deferral responses 1206, 1208, or 1210. The embodiments of FIG. 8, however, are not limited to the features disclosed by FIGS. 1A-4. Flowchart 800 may correspond to step 510 in flowchart 500.

Step 802 executes by receiving an instruction at service provider 104 to generate deferral response 120. In some embodiments, service provider 104 is in an intermediate state in that it is not processing jobs. Alternatively, service provider 104 may be deferring requests due to high volume or high priority tasks. This instruction may be received by deferral component 152, which is the active component when service provider 104 is in the intermediate state.

Step 804 executes by determining whether an opt-in token 126 has been received from the corresponding service requester. Opt-in token 126 may be appended to processing request 122 or may have been provided earlier by the service requester. Service provider 104 may store the opt-in token for reference during a deferral process. If step 804 is no, then step 806 executes by processing the request accordingly. Service provider 104 may be woken up as the deferral option is not available for the particular service requester.

If step 804 is yes, then step 808 executes by determining a condition in which to send with deferral response 120 to the service requester. Example and features of the condition are disclosed above. It should be noted that the condition relates to service provider 104. Service provider 104 specifies the condition to be met before processing operations may resume. The condition is communicated to the service requester, which then determines at the service requester if the condition has been met.

Step 810 executes by calculating a deferral time for deferral response 120. Because the disclosed embodiments support the notion of the delivery of a fixed response, deferral response 120 may include a specific time at which the service requester may resent processing request 122, as opposed to N seconds/minutes from now. A clock for service provider 104 may be incorrect. Although returning the service provider's current time in GMT results in the deferral period not be fixed, if possible, the current time should be provided so that the service requester may do the calculation required to determine when the condition is met.

Step 812 executes by determining the nonce for deferral response 120. Deferral component 152 may take the next available number available so that previous numbers are not used. The nonce also may include additional information applicable to the deferred processing request, as disclosed above. Step 814 executes by determining any random time delay to be sent with deferral response 120.

Step 816 executes by generating deferral response 120 with the data and information provided by steps 808-814. Additional information may be included with the deferral response, as provided by service provider 104. Step 818 executes by encrypting or hashing deferral response 818. The encryption or hash key may be provided to the service requester so that the deferral response may be determined at the service requester. Step 820 executes by sending deferral response 120 to the appropriate service requester. The network connection may be closed after this step.

Figure 9:
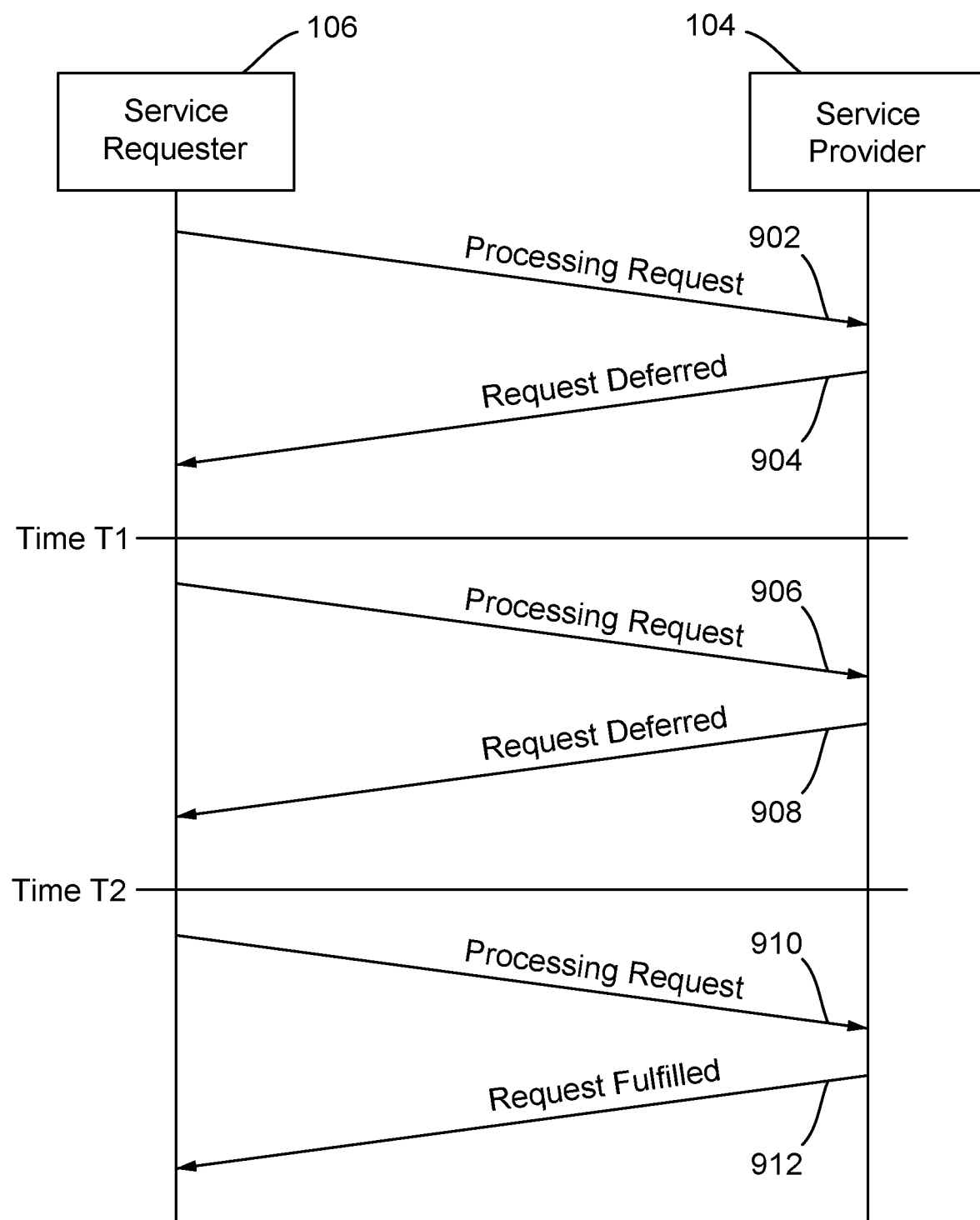
FIG. 9 illustrates a flow diagram for a deferral process between a service requester and a service provider according to the disclosed embodiments.

FIG. 9 depicts a flow diagram 900 for a deferral process between service requester 106 and service provider 104 according to the disclosed embodiments. Flow diagram 900 may show a processing request being deferred twice before fulfilling or processing it at service provider 104. Flow diagram 900 also refers to service requester 106, but it may be applicable to any device within processing system 100.

Operation 902 executes by sending a processing request 106b to service provider 104. Service provider 104 is not fulfilling requests at this time so it generates a deferral response 1206. Operation 904 executes by sending deferral response 1206 from service provider 104 to service requester 106. Deferral response 1206 may have a condition that the processing request may be deferred until after time T1. In some embodiments, information is provided to service requester 106 to synchronize time T1 with service provider 104.

After time T1, as shown on flow diagram 900, operation 906 executes by resending processing request 106b to service provider 104. Again, service provider 104 is not fulfilling requests at this time. For example, service provider 104 may have a lot of tasks to complete after powering up out of the intermediate state. Further requests may not be accepted. Operation 908 executes by executes by sending another deferral response 1206 to service requester 106. This deferral response may include a condition that the processing request may be deferred until after time T2. In some embodiments, information is provided to service requester 106 to synchronize time T2 with service provider 104.

After time T2, which is later than time T1, operation 910 executes by resending for a second time processing request 106b to service provider 104. After time T2, service provider 104 is received and fulfilling processing requests. In some embodiments, after time T2, service provider 104 may only be accepting processing requests from service requester 106. Operation 912 executes by indicating to service requester 106 that the request was processed and fulfilled. The task or job is completed at service provider 104.

Figure 10:
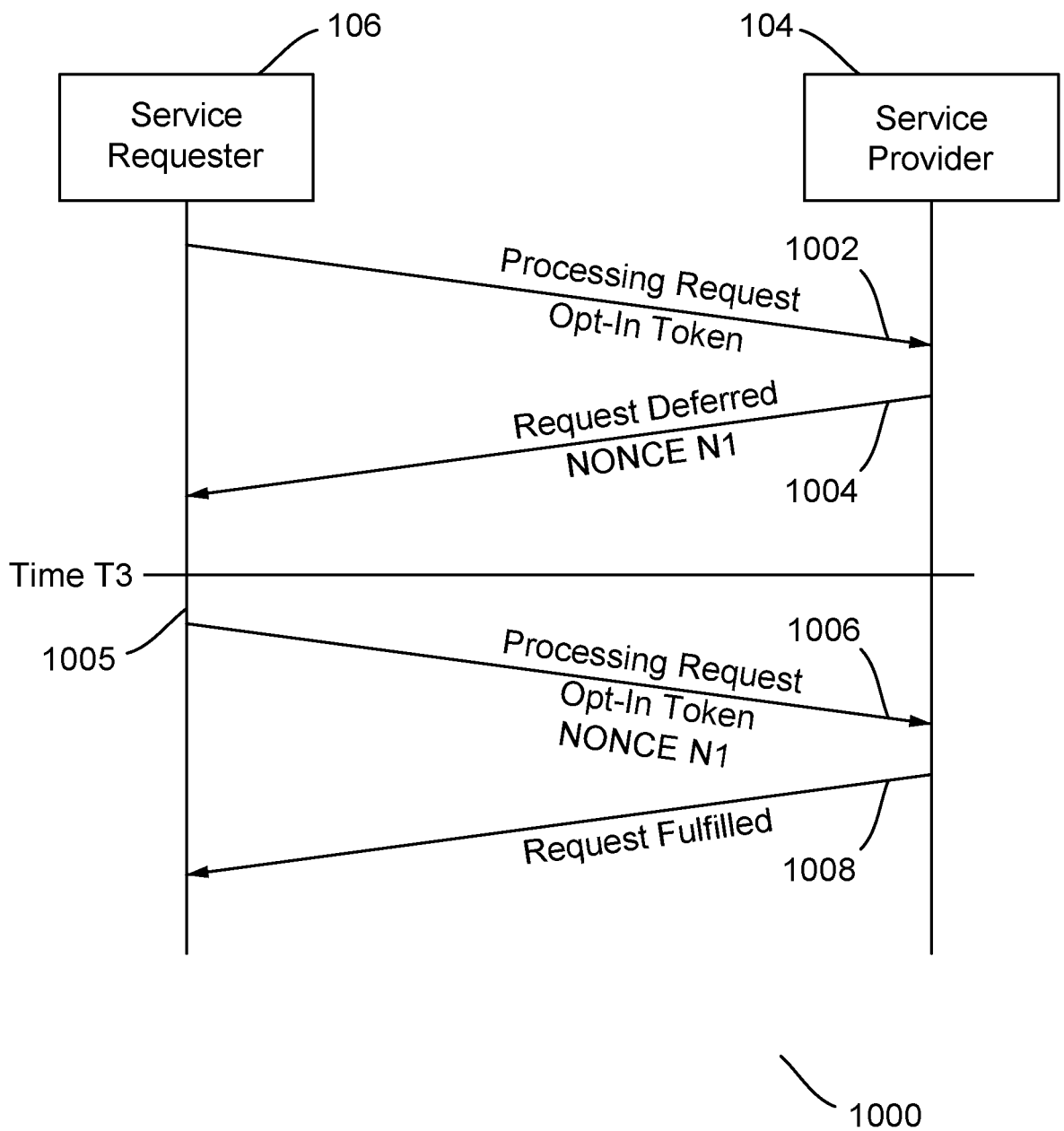
FIG. 10 illustrates a flow diagram for another deferral process between a service requester and a service provider according to the disclosed embodiments.

FIG. 10 depicts a flow diagram 1000 for another deferral process between service requester 106 and service provider 104 according to the disclosed embodiments. Flow diagram 1000 may show a processing request being delayed randomly before being resent to service provider 104. Flow diagram 1000 also refers to service requester 106, but it may be applicable to any device within processing system 100.

Operation 1002 executes by sending a processing request 106b to service provider 104. Processing request 106b also may include opt-in token 106d that indicates service requester 106 will allow its requests to be deferred. Service provider 104 is not fulfilling requests at this time so it generates a deferral response 1206. Operation 1004 executes by sending deferral response 1206 from service provider 104 to service requester 106. Deferral response 1206 may have a condition that the processing request may be deferred until after time T3. In some embodiments, information is provided to service requester 106 to synchronize time T3 with service provider 104. Deferral response 1206 also may include nonce N1 generated by service provider 104.

After time T3, as shown on flow diagram 1000, service requester 106 determines that the condition is met and processing request 106b may be resent. A random time delay 1005, however, may be implemented to avoid congestion at service provider 104. Service requester 106 delays further operations until the delay is over.

Operation 1006 executes by resending processing request 106b to service provider 104. Processing request 106b again includes opt-in token 106d in the event processing needs to be deferred. Processing request 106b also includes nonce N1. In embodiments where processing request 106b is deferred multiple times, such as disclosed in flow diagram 900, the request includes the most recent nonce N1. The nonce should be different in every deferral response. Operation 1008 executes by indicating that the request is fulfilled or the task is complete.

Figure 11:
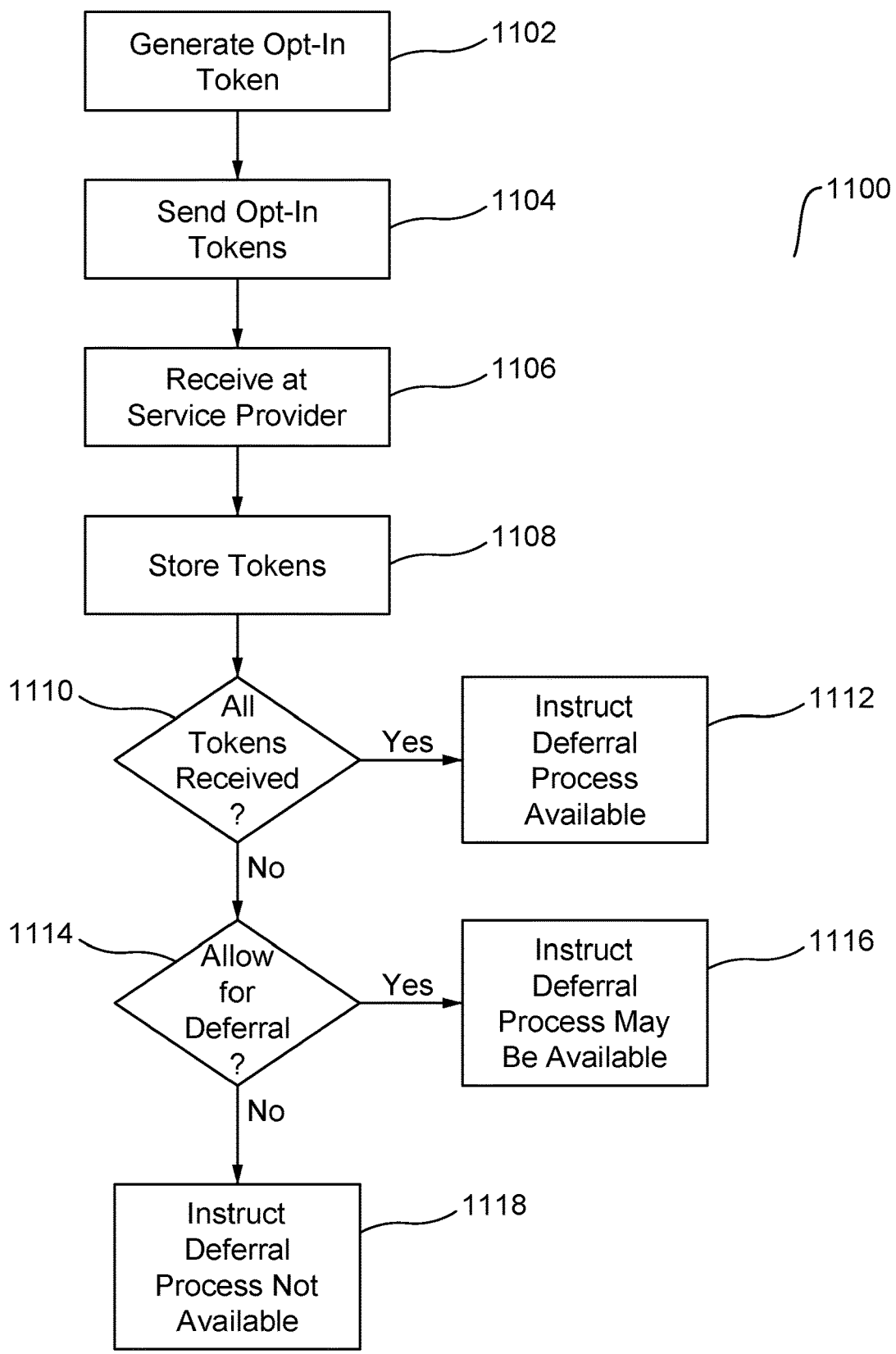
FIG. 11 illustrates a flowchart for managing opt-in tokens in the processing system according to the disclosed embodiments.

FIG. 11 depicts a flowchart 1100 for managing opt-in tokens 126 in processing system 100 according to the disclosed embodiments. Flowchart 1100 may refer to FIGS. 1A-4 for illustrative purposes. For example, the disclosure of flowchart 1100 may refer to opt-in tokens 126 but may be applicable to opt-in tokens 106d, 108d, and 110d. The embodiments of FIG. 11, however, are not limited to the features disclosed by FIGS. 1A-4.

As disclosed above, an opt-in token may be needed from the corresponding service requester in order to defer processing requests from that requester. Service provider 104 may stores the opt-in tokens in token table 153 to access the table to determine whether received processing requests may be deferred. In some embodiments, an opt-in token must be received from each service requester in processing system 100 in order from the disclosed deferral processes to occur. Service provider 104 may not enter the intermediate state until all opt-in tokens are in token table 153.

Step 1102 executes by generating opt-in token 106d at service requester 106. Opt-in token 106d is disclosed, but these features also may apply to opt-in tokens 108d and 110d. Opt-in token 106d may be a string of data that provides information to identify service requester 106, an attached processing requester 106b (if applicable), and a flag or other data that informs service provider 104 that the service requester opts into the deferral processes. Other service requesters also generate their opt-in tokens. Step 1104 executes by sending the opt-in tokens from the service requesters in processing system 100 to service provider 104. If applicable, the opt-in tokens also may be sent to service provider 105.

Step 1106 executes by receiving opt-in tokens 126 at service provider 104. Step 1108 executes by storing the received opt-in tokens in token table 153. Token table 153 may be located in a memory on service provider 104. Token table 153 may have entries for each requester in processing system 100 that may send processing requests. Once these entries are filled, service provider 104 may acknowledge this by enabling deferral component 152.

Step 1110 executes by determining whether all opt-in tokens have been received from each service requester at service provider 104. Service provider 104 may check in token table 153 to see if the required number of tokens are stored therein. If yes, then step 1112 executes by instructing the appropriate components of service provider 104 that the disclosed deferral processes are available. For example, deferral component 152 may be instructed that it may enter service provider 104 into the intermediate state to power down and defer processing requests. Every service requester provided an opt-in token to opt into deferring processing requests until service provider 104 is operational. This feature allows service provider 104 to cease operations until a predetermined point in the future, preferably without interruption.

If step 1110 is no, then step 1114 executes by determining whether service provider 104 allows for the deferral of processing request when in receipt of opt-in tokens from some of the service requesters. For example, token table 153 includes opt-in tokens 106d and 108d but not 110d. Service requester 110 has not opted into letting its processing requests to be deferred. If yes, then step 1116 executes by instructing the appropriate components that the deferral process may be available from under some circumstances. Received processing requests may be compared to token table 153. If the table includes a token from the requesting service requester, then the processing request may be deferred. If not, then service provider 104 becomes operational to process the request.

If step 1114 is no, then step 1118 executes by instructing the appropriate components of service provider 104 that the deferral processes are not available. Service provider 104 may not enter the intermediate state. Service provider 104 may wait until another service request is received to see if it includes an opt-in token to add to token table 153 and determining whether deferral processes are available.

Figure 12:
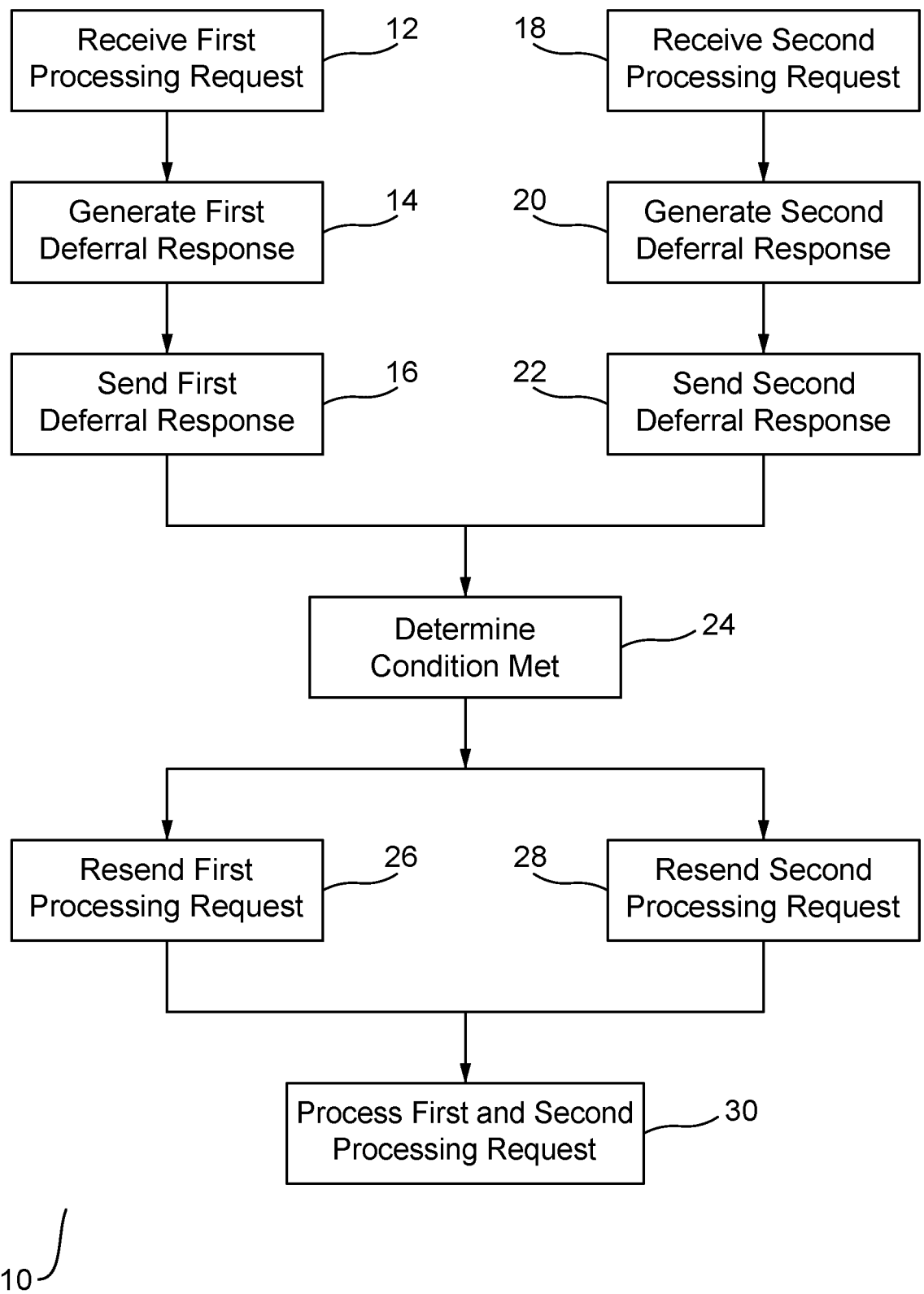
FIG. 12 illustrates a flowchart for deferring processing requests from first and second service requesters according to the disclosed embodiments.

FIG. 12 illustrates a flowchart 10 for deferring processing requests from first and second service requesters according to the disclosed embodiments. Flowchart 10 may refer to FIGS. 1A-4 for illustrative purposes. For example, the disclosure of flowchart 10 may refer to processing request 122 but may be applicable to processing requests 106d, 108d, and 110d. The embodiments of FIG. 12, however, are not limited to the features disclosed by FIGS. 1A-4.

Flowchart 10 accounts for the condition when more than one service requester sends processing requests that are deferred. For illustrative purposes, service providers 106 and 108 and their associated processing requests and other data may be disclosed below. Flowchart 10, however, may execute using any number of service requesters. Flowchart 10 may execute while service provider 104 is in intermediate state 104i. The appropriate opt-in tokens are stored on service provider 104 to allow the deferral processes to occur.

Step 12 executes by receiving a first processing request 106b from service provider 106. Step 14 executes by generating a first deferral response 1206 at service provider 104. First deferral response 1206 may include an indicator, such as a nonce, in response to first processing request 106b. The indicator may be unique to first processing request 106b as well as first deferral response 1206. Step 16 executes by sending first deferral response 1206 to service requester 106. Any network connection between service provider 104 and service requester 106 may be closed.

Step 18 executes by receiving a second processing request 108b from service provider 108. Step 20 executes by generating a second deferral response 1208 at service provider 104. Second deferral response 1208 also may include an indicator, such as a nonce, in response to second processing request 108b. The indicator may be unique to second processing request 108b as well as second deferral response 1208 and different from the indicator of first deferral response 1206. Step 22 executes by sending second deferral response 1208 to service requester 108. Any network connection between service provider 104 and service requester 108 may be closed.

Step 24 executes by determining that the condition has been met to exit service provider 104 from its intermediate state and back to the operational state. Use of conditions is disclosed above. Step 26 executes by resending first processing request 106b along with the indicator in first deferral response 1206. Step 28 executes by resending second processing request 108b along with the indicator in second deferral response 1208. If more than one processing request is resent from each service requester, then each resent request will have a unique indicator received in its associate deferral response.

Step 30 executes by processing first processing request 106b and second processing request 108b according to its indicator. For example, if the indicator is a nonce, then service provider 104 processes the resent request in order of the nonce. In some embodiments, the lowest value nonce is processed first. Second processing request 108b may not necessarily be processed after first processing request 106b as its indicator may prescribe that it be given priority over other requests. Thus, multiple requests from a plurality of service requesters may be deferred and processed according to the disclosed embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for managing job requests in a system, the method comprising:
    receiving opt-in tokens at a service provider from a plurality of service requesters, wherein each service requester provides an opt-in token;
    placing the service provider into an intermediate state when the opt-in token for each service requester is confirmed;
    sending a deferral response having a condition and an indicator for each processing request for the plurality of service requesters, wherein the indicator is unique to each deferral response;
    closing each of a plurality of network connections between the service provider and the plurality of service requesters during the intermediate state;
    deferring the each processing request at the respective service requester until the condition is met;
    removing the service provider from the intermediate state;
    receiving the each processing request again with the indicator at the service provider after the condition is met; and
    processing the each processing request according to the indicator.

2. The method of claim 1, wherein the indicator is a number unique to the deferral response.

3. The method of claim 1, further comprising maintaining the each processing request at its respective service requester.

4. The method of claim 3, wherein the maintaining includes caching data for the processing request at the respective service requester.

5. The method of claim 1, wherein the condition is a specified time.

6. The method of claim 1, further comprising generating the deferral response with the condition before the placing step.

7. The method of claim 1, further comprising sending the each processing request from each service requester with a random time delay after the condition is met.

8. The method of claim 1, wherein the closing includes closing at least one of the plurality of network connections using a router connected to the service provider.

9. A system of managing processing jobs, the system comprising:
    a plurality of service providers to process the processing jobs, wherein each of the plurality of service providers has an operational state and an intermediate state such that
        the operational state performs the processing jobs, and
        the intermediate state defers the processing jobs until a condition is met,
        wherein each of the plurality of service providers generates a deferral response to send during the intermediate state;
    a plurality of computers connected in the system to the plurality of service providers, wherein the plurality of service requesters generates the processing jobs and sends processing requests to the plurality of service providers to perform the processing jobs; and
    at least one router to connect the plurality of service providers and the plurality of service requesters, wherein the at least one router closes at least one network connection between a first service provider of the plurality of service providers and the plurality of service requesters during the intermediate state,
    the plurality of computers configured
        to defer sending the processing jobs while the at least one network connection is closed to the first service provider of the plurality of service providers upon receipt of a first deferral response having a first condition from the first service provider, and
        to resend the processing jobs to the first service provider when the first condition is met and the at least one network connection is open.

10. The system of claim 9, wherein the plurality of service providers includes a second service provider to send a second deferral response having a second condition to the plurality of service requesters during the intermediate state.

11. The system of claim 10, wherein the plurality of service requesters is configured
    to maintain the processing jobs for the second service provider upon receipt of the second deferral response having the second condition, and
    to resend the processing jobs to the second service provider when the second condition is met.

12. The system of claim 9, wherein the each of the plurality of service providers has an off state such that no processing jobs are performed and no deferral requests are sent.

13. The system of 10, wherein the intermediate state uses less power than the operational state.

14. The system of claim 9, wherein each of the plurality of service requesters provides an opt-in token to each of the plurality of service providers.

15. The system of claim 14, wherein the first service provider enters the intermediate state to send the first deferral request upon receipt of the opt-in token from each of the plurality of service requesters.

16. The system of claim 9, wherein the first deferral response having the first condition includes a first indicator unique to each service requester.

17. The system of claim 16, wherein the first service provider is configured to process the resent processing requests according to the first indicators.

18. A method for deferring processing requests at a service provider, the method comprising:
- receiving opt-in tokens at a service provider from a first service requester and a second service requester;
- placing the service provider into an intermediate state, wherein the intermediate state uses less power than an operational state for the service provider;
- receiving a first processing request from the first service requester at the service provider;
- receiving a second processing request from the second service requester at the service provider;
- sending a first deferral response having a condition and a first indicator to the first service requester from the service provider;
- sending a second deferral response having the condition and a second indicator to the second service requester from the service provider;
- when the condition is met, resending the first processing request and the second processing request to the service provider; and
- processing respective processing jobs for the first processing request according to the first indicator and the second processing request according to the second indicator,
- wherein the first indicator differs from the second indicator.

19. The method of claim 18, wherein the first indicator includes a first number and the second indicator includes a second number different from the first number.

* * * * *